United States Patent [19]

Hoyer et al.

[11] 4,378,312
[45] Mar. 29, 1983

[54] WATER-SOLUBLE AZO DYESTUFFS

[75] Inventors: Ernst Hoyer; Fritz Meininger, both of Frankfurt am Main; Rüdolf Fass, Kelkheim, all of Fed. Rep. of Germany

[73] Assignee: Hoechst Aktiengesellschaft, Frankfurt am Main, Fed. Rep. of Germany

[21] Appl. No.: 219,499

[22] Filed: Dec. 23, 1980

Related U.S. Application Data

[63] Continuation of Ser. No. 956,321, Oct. 31, 1978, abandoned.

[30] Foreign Application Priority Data

Nov. 2, 1977 [DE] Fed. Rep. of Germany ....... 2748929

[51] Int. Cl.$^3$ .................. C09B 33/02; C09B 33/06
[52] U.S. Cl. .................. 260/146 T; 260/153; 8/639; 8/623; 8/624; 8/618
[58] Field of Search .................. 260/153, 146 T

[56] References Cited

U.S. PATENT DOCUMENTS

| | | | |
|---|---|---|---|
| 2,931,794 | 4/1960 | Ruetimeyer et al. | 260/146 T |
| 3,206,451 | 9/1965 | Benz et al. | 260/153 |
| 3,304,297 | 2/1967 | Wegmann et al. | 260/153 |
| 3,591,577 | 7/1971 | Moiso et al. | 260/153 |
| 4,038,267 | 7/1977 | Sueda et al. | 260/153 |

*Primary Examiner*—Paul F. Shaver
*Attorney, Agent, or Firm*—Curtis, Morris & Safford

[57] ABSTRACT

Water-soluble compounds and their salts suitable as dyestuffs of the formula

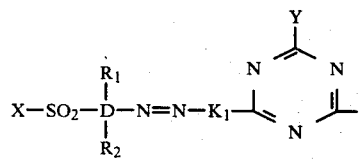

-continued

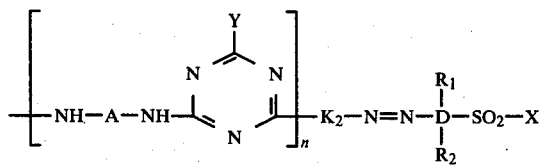

in which D is a benzene or naphthalene nucleus, $R_1$ and $R_2$ are, inter alia, hydrogen, halogen, lower alkyl, lower alkoxy and sulfo, $R_1$ being in ortho-position to the azo group, X is a fiber-reactive radical of the vinyl sulfone series, $K_1$ and $K_2$ are radicals of coupling components of the acetoacetarylide and pyrozolone series and $K_2$ additionally denotes a radical of the sulfonaphthol series, the coupling components being bound to the triazine ring via amino groups, Y is a halogen atom, a sulfo group, a thio ether or oxygen ether radical, or a primary, secondary or tertiary amino group, A is an aliphatic, aliphatic-heterocyclic, aliphatic-aromatic or aromatic bridge member and n is zero or one. The novel compounds are prepared, for example, by reacting 2 mols of the diazo component with the fiber-reactive radical of the vinyl sulfone series with 1 mol of a bivalent coupling component containing the two radicals $K_1$ and $K_2$ linked to each other by the triazine ring, or 2 triazine radicals linked with each other by bridge member A; or by reacting one mol each of a monoazo compound consisting of the said diazo component with the fiber reactive radical and a coupling component $K_1$ or $K_2$ with a corresponding triazine radical additionally carrying a halogen atom capable of reacting with the amino group. The metal-free compounds can be transformed into the corresponding heavy metal complex, preferably copper, cobalt and chromium complex compounds, by treatment with an agent donating a heavy metal cation. The novel compounds are excellently suitable for dyeing and printing fiber material of natural and regenerated cellulose and natural, regenerated and synthetic polyamides. They are distinguished by high tinctorial strength, a very good uptake from a long liquor, a good color-build up. The dyeings and prints obtained therewith have a high fastness to processing and in use.

16 Claims, No Drawings

WATER-SOLUBLE AZO DYESTUFFS

This is a continuation of application Ser. No. 956,321 filed Oct. 31, 1978 now abandoned.

With the present invention, novel water-soluble dyestuffs of the general formula (1)

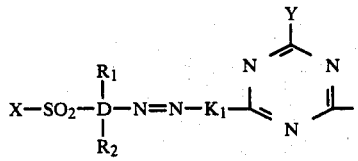

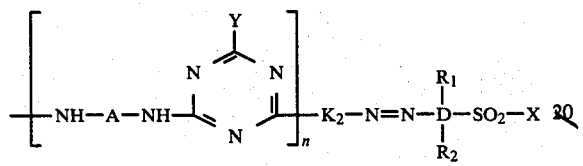

(1)

and their heavy metal complex compounds have been found.

The novel dyestuffs of the formula (1) can be in the form of the free acid or in the form of their salts. They are preferably in the form of the salts, especially the alkali metal and alkaline earth metal salts and in particular in the form of the sodium, potassium and calcium salts. They are preferably used in the form of the alkali metal salts for dyeing and printing fiber materials.

In the above formula (1), the various radicals in the formula have the following meaning: $K_1$ and $K_2$ are identical or different and $K_1$ represents one of the radicals of the general formulae, described in the form of the free acid

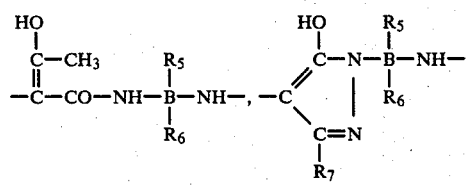

in which $R_5$, $R_6$ and $R_7$ are identical or different and $R_5$ denotes a hydrogen atom, a lower alkyl group, such as a methyl group, a lower alkoxy group, such as a methoxy group, or a sulfonic acid group, $R_6$ denotes a hydrogen atom, a lower alkyl group, such as a methyl group, or a sulfonic acid group and $R_7$ denotes a lower alkyl group, such as a methyl group, a carboxy group or a carbalkoxy group with 1-4 C atoms in the alkyl radical, such as a carbomethoxy or carboethoxy group, and B is a benzene nucleus or a naphthalene nucleus, and $K_2$ is identical or different to $K_1$ and of the general formulae given below, described in the form of the free acid

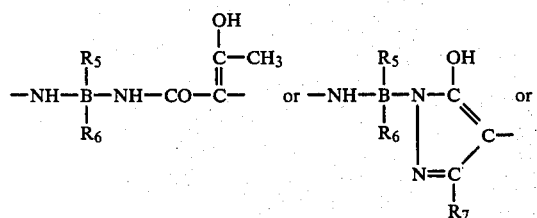

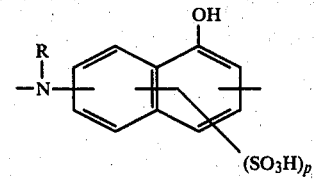

in which B, $R_5$, $R_6$ and $R_7$ are as defined above and R represents a hydrogen atom or a lower alkyl group, such as a methyl group, and p represents the number 1 or 2, examples which may be given of the abovementioned aminonaphtholsulfonic acid radical being the bivalent radicals of the formulae

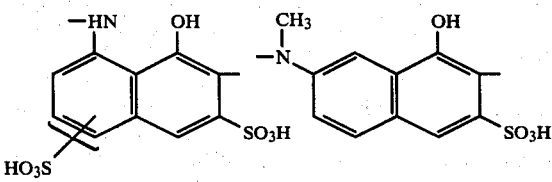

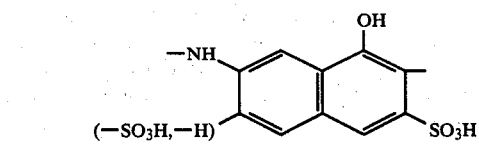

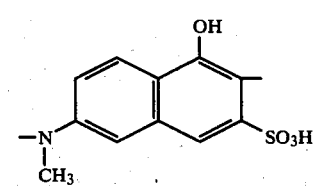

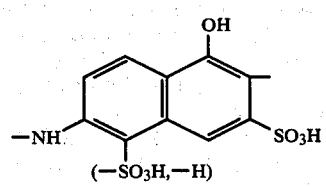

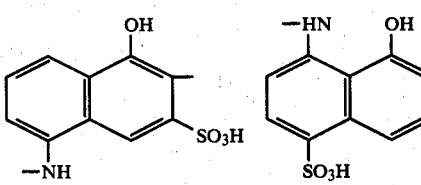

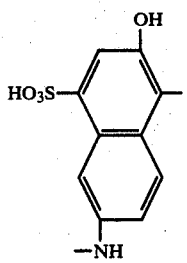

and the radicals $K_1$ and $K_2$ in the formula are bonded via the amino groups to the s-triazine radicals and in the ortho-position relative to the hydroxy groups to the azo groups; n represents the number nought or 1; D is a benzene nucleus or naphthalene nucleus; $R_1$ is in the ortho-position relative to the azo group and denotes a hydrogen atom, a halogen atom, preferably a chlorine or bromine atom, a lower alkyl group, preferably a methyl group, a lower alkoxy group, preferably a methoxy group, a hydroxy or carboxy group or a sulfonic acid group and $R_2$ is a hydrogen atom, a halogen atom, preferably a chlorine or bromine atom, a lower alkyl group, preferably a methyl group, a lower alkoxy group, preferably a methoxy group, a nitro group or a sulfonic acid group, it being possible for $R_1$ and $R_2$ to be identical or different from one another; X represents the $\beta$-thiosulfatoethyl or $\beta$-chloroethyl group, preferably the $\beta$-sulfatoethyl or vinyl group; A is an aliphatic radical of 2–10 C atoms, especially an alkylene radical of 2–6 C atoms, or an aliphatic radical, especially an alkylene radical, of, in total, 2–6 C atoms, which can be interrupted by a hetero-atom and/or cycloaliphatic radical, for example by 1 or 2 such members from the group comprising —NH—, —O— and —N(CH$_3$)— and/or by a sulfur atom or a cyclohexylene group, or is a cycloaliphatic radical, such as, for example, a cyclohexylene radical, which can also be substituted by 1–3 methyl groups, or is a benzene nucleus or a naphthalene nucleus, which can also be substituted by substituents from the group comprising lower alkyl, such as, for example, methyl or ethyl, lower alkoxy, such as, for example, methoxy and ethoxy, chlorine, sulfo, carboxy and lower alkanoylamino, such as acetylamino, or is one of the radicals of the formulae

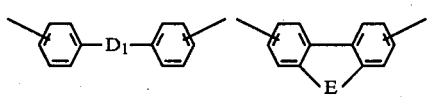

in which the benzene nuclei can be substituted by substitutents, preferably 1 or 2 substituents, from the group comprising lower alkyl, such as methyl, lower alkoxy, such as methoxy, sulfo, carboxyl and chlorine, and in which $D_1$ is a direct covalent bond or a bridge member, for example a bridge member of the formulae —CH$_2$—, —CH$_2$—CH$_2$—, —O—CH$_2$—CH$_2$—O—, —CH=CH—, —NH—, —O—, —S—, —SO$_2$—, —N=N—, —NH—CO—NH—, —CO—NH—, —NH—CO—,

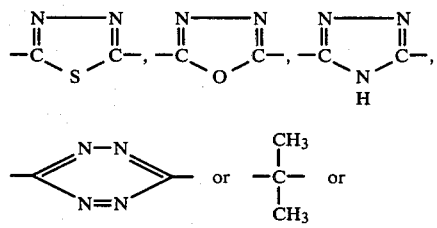 or 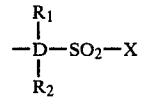 or of a cyclohexylene radical, especially a radical of the formula

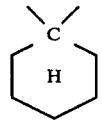

preferably a bridge member of the formula —CH$_2$—, —CH$_2$—CH$_2$—, —CH=CH—, —NH—, —SO$_2$—, —CO—NH— or —NH—CO— or the above-mentioned bivalent radical of oxadiazole or preferably a direct covalent bond, and E represents a member of the formula —O—, —S—, —NH— or —SO$_2$—; and Y is a chlorine, fluorine or bromine atom or a sulfonic acid group or a group which consists of a substituent bonded via a sulfur or oxygen atom and is of the formula —S—R' or —O—R", in which R' is preferably a substituent from the group comprising lower alkyl, substituted lower alkyl, phenyl, naphthyl, substituted phenyl, substituted naphthyl or 2-benzthiazolyl, such as, for example, lower alkyl substituted by substituents from the group comprising hydroxy, lower alkoxy, sulfato, sulfo, carboxy, phenyl, naphthyl, substituted phenyl and substituted naphthyl, or, for example, phenyl or naphthyl substituted by substituents from the group comprising nitro, sulfo and carboxy, and R" denotes a hydrogen atom or has the meaning of R' with the exception of 2-benzthiazolyl, or Y is an amino group of the formula —NR$_3$R$_4$, in which R$_3$ is a hydrogen atom, an optionally substituted lower aliphatic radical or an optionally substituted araliphatic radical or a cycloaliphatic radical, such as, for example, a lower alkyl radical, which can be substituted by one or two substituents from the group comprising hydroxy, sulfato, lower alkoxy, sulfo, carboxy and phenyl, or is a cyclohexyl radical, and R$_4$ represents a hydrogen atom, an optionally substituted lower aliphatic radical, such as, for example, a lower alkyl radical, which can be substituted by hydroxyl, lower alkoxy, sulfato, sulfo and carboxy, or represents an optionally substituted aromatic radical, such as, for example, a phenyl or naphthyl radical, which can be substituted by one or two substituents from the group comprising hydroxy, carboxy, sulfo, lower alkyl and lower alkoxy, or represents an optionally substituted araliphatic radical, such as, for example, a lower alkyl radical, which can be substituted by phenyl or naphthyl, or represents a hydroxy group or a lower alkoxy group or represents an optionally substituted amino group, such as, for example, the amino group or a phenylamino or lower alkylamino group, or in which R$_3$ and R$_4$ together with the nitrogen atom form a ring containing a lower alkylene radical and optionally a hetero-atom, such as, for example, a nitrogen atom or oxygen atom, such as, for example a morpholine, piperidine or piperazine ring.

The two radicals $$-\underset{\underset{R_2}{|}}{\overset{\overset{R_1}{|}}{D}}-SO_2-X$$

in the formula can be identical or different in the general formula (1); preferably they are identical.

Here and in the text which follows, the term "lower" used in the definitions denotes that the alkyl or alkylene radical contained in the group consists of 1–4 C atoms.

The present invention also relates to heavy metal complex dyestuffs of the abovementioned formula (1), in which one or both of the R$_1$s represents a hydroxy group and bond the metal as a complex with the hydroxy groups of the coupling component or components. The heavy metal complex dyestuffs are preferably those in which two heavy metal equivalents are each bonded as a complex to one molecule of the formula (1), specifically in each case to the hydroxyl groups R$_1$ and those of the aminonaphthol-disulfonic acid radicals. Preferred heavy metal complex dyestuffs are the copper, cobalt and chromium complex dyestuffs of the formula (1) according to the invention, especially the copper complex dyestuffs.

The present invention also relates to a process for the manufacture of the novel dyestuffs of the formula (1), which comprises reacting 2 moles of the diazonium compound of one or two aromatic amines, preferably a single aromatic amine of the general formula (2)

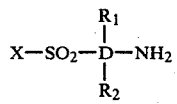
(2)

in which D, $R_1$, $R_2$ and X are as defined above and $R_1$ is in the ortho-position relative to the amino group, with 1 mole of a coupling component of the general formula (3)

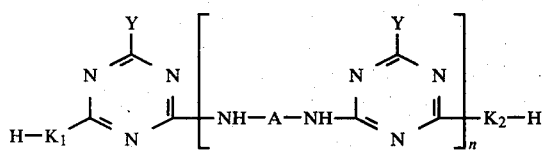
(3)

in which A, $K_1$, $K_2$, n and Y are as defined above.

The present invention also relates to a process for the manufacture of the heavy metal complex dyestuffs of the abovementioned general formula (1), which comprises reacting the metal-free dyestuffs of the formula (1) in which $R_1$ represents a hydrogen atom or a hydroxy or lower alkoxy group, if desired immediately following the abovementioned procedure, according to the invention, for the manufacture of these metal-free dyestuffs of the formula (1), in a manner which is in itself known, if appropriate in the presence of an oxidizing agent, with a metal donor.

The metal-free dyestuffs of the formula (1) or their heavy metal complexes can; however, also be manufactured in a manner according to the invention by subjecting one mole of each of the monoazo compounds of the general formulae (4) and (5)

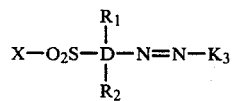
(4)

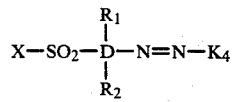
(5)

described in the form of the free acids, in which $R_1$, $R_2$, D and X are as defined above and $K_3$ and $K_4$ are identical or different, preferably identical, and $K_3$ represents one of the radicals of the general formulae, described in the form of the free acid,

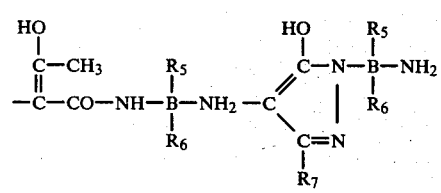

and $K_4$ is a radical as defined above, which can be identical or different to $K_3$, or represents a radical of the general formula

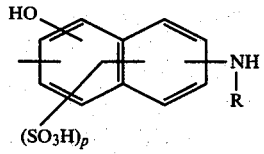

in which B, $R_5$, $R_6$, $R_7$, R and p are as defined above, the above aminonaphtholsulfonic acid radical representing, for example, a radical of the formulae

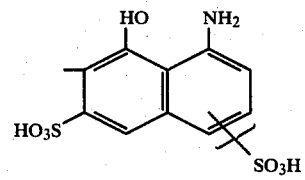

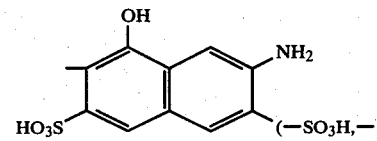
(—$SO_3H$,—H)

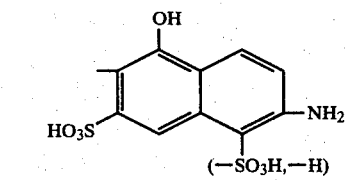
(—$SO_3H$,—H)

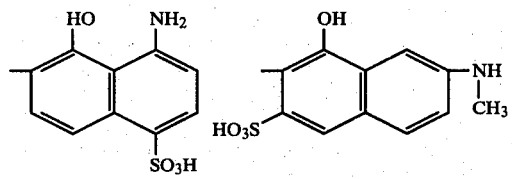

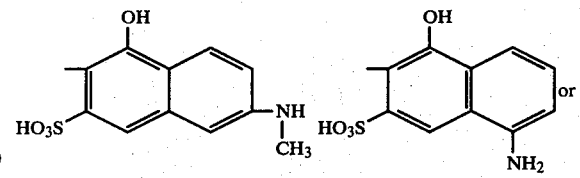

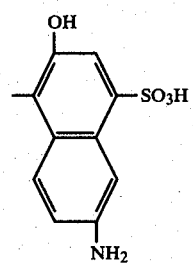

the azo group being bonded to the radicals $K_3$ and $K_4$ in the formulae in each case in the position adjacent to the hydroxy group, or two moles of their heavy metal complex compounds in which $R_1$ is a hydroxy group, preferably the 1:1 copper complex compounds, or 1 mole of these heavy metal complex compounds of the formula (4) or (5) and 1 mole of the metal-free compound of the formula (5) or, respectively, (4) to a condensation reaction with a halogeno-s-triazine compound of the formula (6)

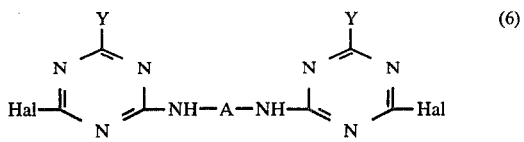

in which A and Y are as defined above and Hal represents a chlorine, bromine or fluorine atom, and, if desired, subsequently reacting the product in a manner which is in itself known, if appropriate in the presence of an oxidizing agent, with an agent which donates a heavy metal cation.

The novel metal-free or metal-containing dyestuffs of the formula (1) in which $K_1$ and $K_2$ are identical can also be manufactured in a manner according to the invention by subjecting 2 moles of a monoazo compound of the formula (7)

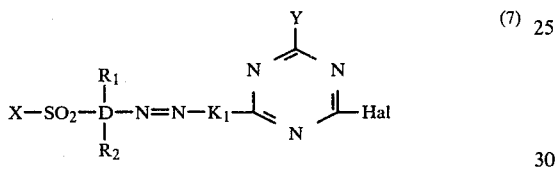

in which D, $R_1$, $R_2$, X, Y and Hal are as defined above and $K_1$ represents one of the abovementioned radicals, which is identical to $K_2$, to a condensation reaction with one mole of a compound of the formula (8)

in which A is as defined above, and, if desired, reacting the metal-free dyestuff of the formula (1), thus obtained, in a manner which is in itself known, if appropriate in the presence of an oxidizing agent, with a metal donor.

The novel dyestuffs of the present invention in which n=nought can also be manufactured, in a manner according to the invention, by subjecting 1 mole of each of the monoazo compounds of the above formulae (4) and (5), which can have the same or different meanings, or 2 moles of their heavy metal complex compounds in which $R_1$ is a hydroxy group, preferably the 1:1 copper complex compounds, or 1 mole of these heavy metal complex compounds of the formula (4) or (5) and 1 mole of the metal-free compound of the formula (5) or, respectively, (4) to a condensation reaction with a halogeno-s-triazine compound of the formula (9)

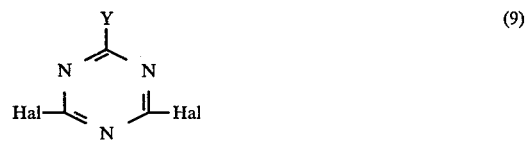

in which Y and Hal are as defined above, and, if desired, subsequently reacting the product in a manner which is in itself known, if appropriate in the presence of an oxidizing agent, with an agent which donates a heavy metal cation.

The abovementioned condensation reactions are preferably carried out in aqueous solution, optionally in the presence of organic solvents, at room temperature (15°–25° C.) or elevated temperature (up to 120° C.) in accordance with known processes in an analogous manner well known to those skilled in the art. If the heavy metal complex dyestuffs according to the invention are manufactured by subsequent metallization, as indicated here, one or both of the $R_1$s can be a hydrogen atom, a hydroxy group or a lower alkoxy group.

It is also possible, in a manner according to the invention, to convert a heavy metal complex dyestuff according to formula (1) into a heavy metal dyestuff according to the invention which contains a different heavy metal central atom, by splitting the original heavy metal atom from the complex dyestuff analogously to the known methods (see, for example, Angew. Chem. 64, 397 (1952)) and reacting the resulting o,o'-dihydroxy-azo dyestuff with an agent which supplies the other heavy metal atom. Thus, for example, copper complex dyestuffs of the formula (1) can be converted to the corresponding chromium or cobalt complex dyestuffs of the formula (1).

Preferred dyestuffs, according to the invention, of the formula (1) and their heavy metal complexes are those in which D represents a benzene nucleus and also those in which D represents a naphthalene nucleus in which the azo group is bonded in the β-position of this naphthalene nucleus. Further preferred dyestuffs according to the invention are those in which Y denotes a halogen atom, preferably a chlorine atom. Furthermore, dyestuffs of particular importance are those in which $K_1$ represents the abovementioned bivalent radical of 1-(3- or 4-aminophenyl)-3-methyl-, -3-carboxy-, -3-carbomethoxy- or -3-carboethoxy-pyrazol-5-one or represents such a radical additionally containing one or two sulfonic acid groups in the phenyl nucleus, or represents the abovementioned bivalent radical of 3- or 4-acetoacetylamino-aniline which in the benzene nucleus may be substituted by one or two sulfonic acid groups, and $K_2$ has one of the preferred means of $K_1$ which have just been given, or is the bivalent radical of 1-amino-naphthol(8)-3,6-disulfonic acid or of 1-amino-naphthol(8)-4,6-disulfonic acid or of 2-amino-naphthol(8)-6-sulfonic acid or of 2-amino-naphthol(5)-7-sulfonic acid, it being possible for $K_1$ and $K_2$ to be identical or different.

In addition to the said halogen atoms and the sulfonic acid group, the following individual groups are to be singled out for the substituent Y in the triazine ring of the dyestuffs of the formula (1) or of the compounds of the formulae (3), (6), (7) and (9):

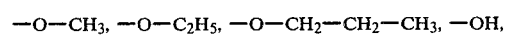

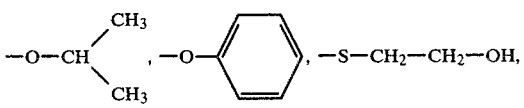

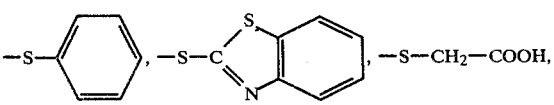

-continued

—S—⌬—NO₂—O—⌬—SO₃H, —NH₂,
  |
  NO₂

—NH—OH, —NH—NH₂, —NH—CH₃, —NHC₂H₅,

—NHC₃H₇, —NH—CH(CH₃)₂,

—NH—CH₂—(cyclohexyl), —NH—CH₂—CH₂—OH,

—NH—CH₂—CH₂—OSO₃H, —NH—CH₂—CH₂—O—CH₃,

—NH—CH₂—CH₂—SO₃H, —NH—CH₂—COOH,

—NHCH₂CH₂COOH, —N(morpholino), —N(CH₃)₂(CH₂CH₂) ,

—N(C₂H₅)₂, —N(CH₃)(C₆H₅), —N(C₆H₅)(CH₂SO₃H),

—NH—C₆H₄—N(CH₃)CH₂CH₂SO₃H,

—NH—C₆H₄—COOH, —NH—C₆H₄—SO₃H,

—NH—C₆H₃(SO₃H)₂, —NH—C₆H₃(SO₃H)₂,

—NH—(naphthyl-SO₃H), —NH—(naphthyl-SO₃H),

—NH—C₆H₃(OH)(COOH), —N(piperidino),

-continued

—NH—NH—C₆H₅, —NH—CH₂—C₆H₅,

—NH—CH₂—CH₂—C₆H₅.

Preferably, the radical Y in the formula denotes a chlorine, bromine or fluorine atom or a sulfo, amino, methylamino, ethylamino, dimethyl-amino, β-hydroxyethyl-amino, N,N-di-(β-hydroxyethyl)-amino, β-methoxyethyl-amino, β-sulfatoethyl-amino, β-sulfoethyl-amino, N-methyl-N-β-sulfoethyl-amino, N-β-carboxyethyl-amino, N-(carboxyphenyl)-amino, N-(sulfophenyl)-amino, N-(disulfo-phenyl)-amino, N-(sulfonaphthyl(1))-amino, N-methylanilino, morpholino, isopropoxy, phenoxy or β-hydroxyethylthioether group.

Further compounds of the formula (1) which should be mentioned as being preferred are those in which D is a benzene nucleus and R₁, R₂, A, n, K₁, K₂, Y and X have one of the abovementioned meanings, especially the preferred meanings, and also compounds of the formula (1) in which D denotes a naphthalene nucleus which is bonded in the 2-position to the azo group, R₁ represents a hydrogen atom and R₂ represents the sulfo group in the 6-position of the naphthalene nucleus, or R₁ denotes the sulfo group and R₂ is hydrogen, and K₁, K₂, A, n, Y and X have one of the abovementioned meanings, especially the preferred meanings.

Further preferred compounds of the formula (1) are those in which D represents a benzene nucleus, in which the group —SO₂—X is in the meta-position or para-position relative to the azo group, or in which D denotes a naphthalene nucleus which is bonded in the 2-position to the azo group and which contains the group —SO₂—X in the 6-position or 8-position, and A, n, R₁, R₂, K₁, K₂, Y and X have one of the abovementioned meanings, especially the preferred meanings.

Further compounds to be singled out are those in which, in the coupling components K₁ and K₂, the radicals B in each case denote a benzene nucleus, R₅, identical to or different from each other, is hydrogen or a sulfonic acid group and each R₆ represents a sulfonic acid group.

The aromatic amines of the formula (2) are known, for example from German Pat. Nos. 1,278,041, 1,276,842, 1,150,163, 1,126,542 and 1,153,029, from German Offenlegungsschriften Nos. 2,154,943, 2,100,080, 2,049,664, 2,142,728, 2,034,591 and 1,943,904 or from German Auslegeschrift No. 1,204,666.

Aromatic amines of the formula (2) which may be mentioned are, in particular, the following compounds: aniline-3-β-sulfatoethylsulfone, aniline-4-β-sulfatoethylsulfone, 2-amino-toluene-4-β-sulfatoethylsulfone, 2-aminoanisole-4-β-sulfatoethylsulfone, 2-amino-anisole-5-β-sulfatoethylsulfone, 2-amino-4-β-sulfatoethylsulfonyl-benzoic acid, 2-methoxy-5-methyl-aniline-4-β-sulfatoethylsulfone, 2,5-dimethoxy-aniline-4-β-sulfatoethylsulfone, 2,4-dimethoxyaniline-5-β-sulfatoethylsulfone, 4-aminoanisole-2-β-sulfatoethylsulfone, 4-aminotoluene-2-β-sulfatoethylsulfone, 4-β-sulfatoethylsulfonyl-aniline-2-sulfonic acid, 5-β-sulfatoethylsulfonyl-aniline-2-sulfonic acid, 2-chloroaniline-4-β-sulfato-ethylsulfone, 2-chloroaniline-5-β-sulfatoethylsulfone, 2-bromoaniline-4-β-sulfatoethylsulfone, 2,6-dichloroaniline-4-β-sulfatoethylsulfone, 2,6-dimethyl-aniline-4-β-sulfatoethylsulfone, 2,6-dimethyl-aniline-3-β-sulfatoethylsulfone, 2-amino-phenol-4-β-sulfatoethylsulfone, 2-amino-phenol-5-β-sulfatoethylsulfone, 6-bromo-2-amino-phenol-4-β-sulfatoethylsulfone, 6-chloro-2-amino-phenol-4-β-sulfatoethylsulfone, 6-nitro-2-amino-phenol-4-β-sulfatoethylsulfone, 4-methyl-2-amino-phenol-5-β-sulfatoethylsulfone, 2-naphthylamine-5-β-sulfatoethylsulfone, 2-naphthylamine-8-β-sulfatoethylsulfone, 8-β-sulfatoethylsulfonyl-2-amino-naphthalene-6-sulfonic acid, 6-β-sulfatoethylsulfonyl-2-amino-naphthalene-1-sulfonic acid, 2-naphthylamine-6-β-sulfatoethylsulfone and the corresponding vinylsulfonyl, β-thiosulfatoethylsulfonyl and β-chloroethylsulfonyl compounds.

The coupling components of the formula (3) can, for example, easily be prepared in a manner which is analogous to the procedures described in German Pat. No. 485,185 and which is well-known to those skilled in the art. Coupling components of the formula (3) which are worthy of mention are, for example, the compounds of the following general formulae (3a) and (3b), in which B, $R_5$, $R_6$, $R_7$, A, Y and n have one of the abovementioned meanings and $K_5$ and $K_6$ represent the radicals, designated in the Table which follows, in which B, $R_5$, $R_6$ and $R_7$ are as defined above.

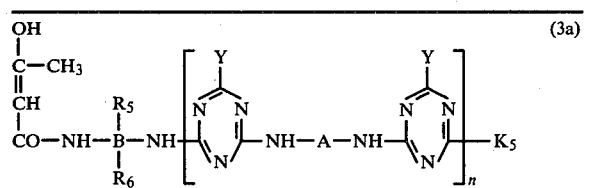
(3a)

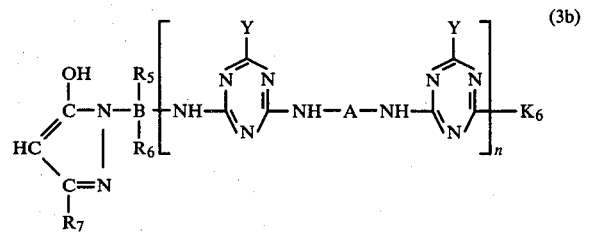
(3b)

| $-K_5$ | $-K_6$ |
|---|---|
| 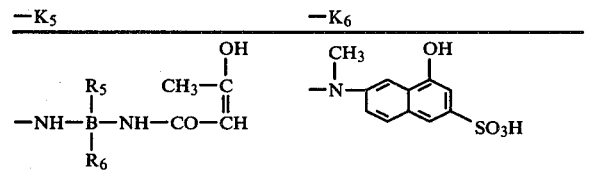 | 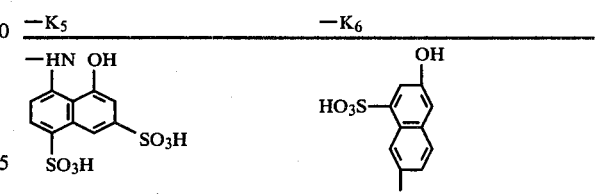 |
| 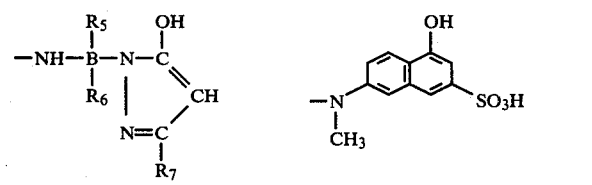 | 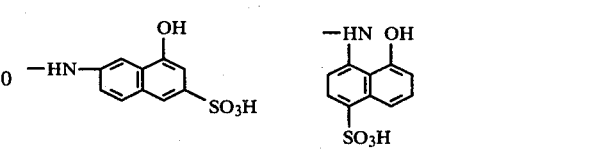 |
| 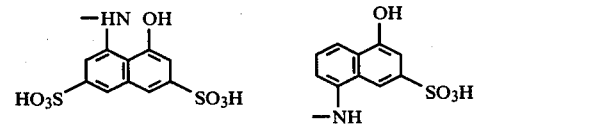 | 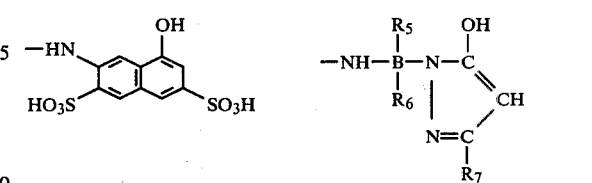 |

-continued

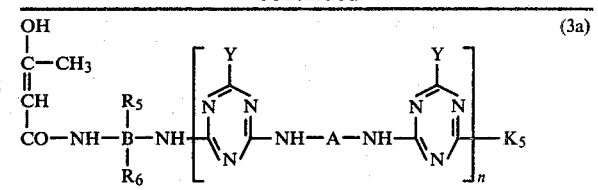
(3a)

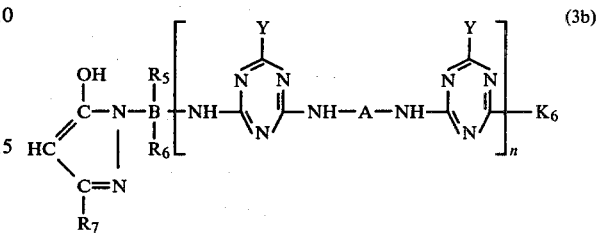
(3b)

| $-K_5$ | $-K_6$ |
|---|---|
| 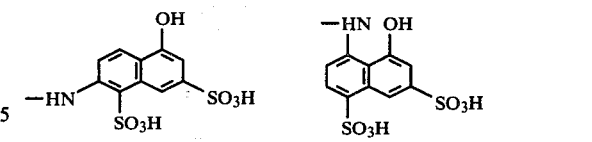 | 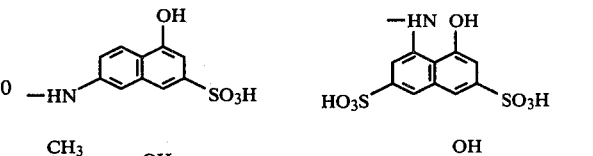 |
| 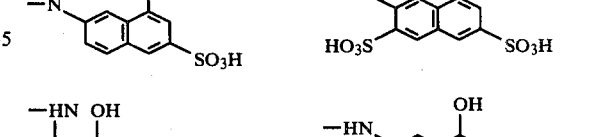 | 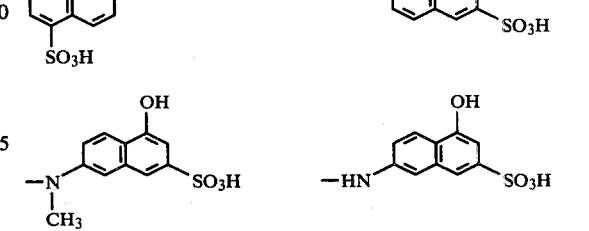 |

-continued

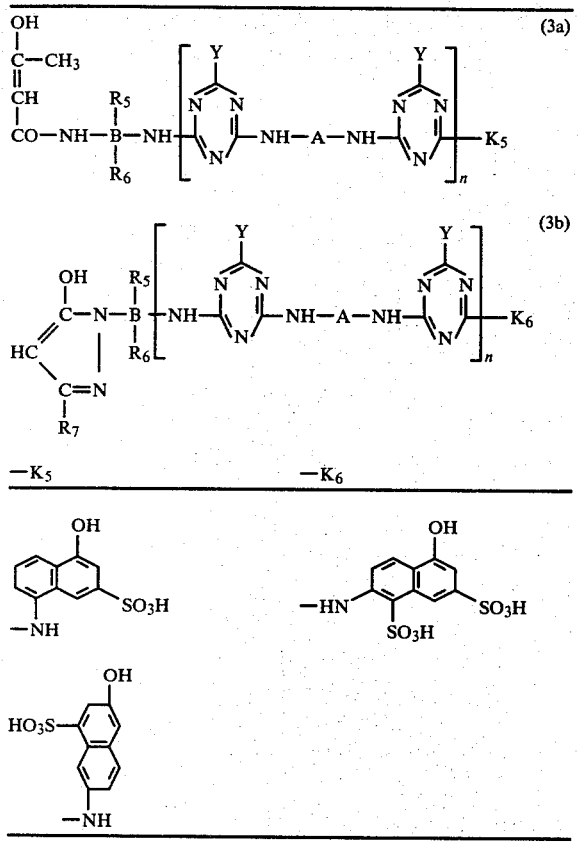

In the abovementioned formulae (3a) and (3b) and in the acetoacetyl-aminoarylamide and 1-(aminoaryl)-pyrazol-5-one radicals which correspondingly represent —K₅ and —K₆ in the above table, the members B, R₅, R₆ and R₇ in the formula have the following preferred meaning: B is a benzene nucleus; R₅ is a hydrogen atom or a methyl or sulfonic acid group; R₆ is a hydrogen atom or a sulfonic acid group and R₇ is a methyl group, a carboxy group, a carbomethoxy group or a carboethoxy group.

The diazotization of the aromatic amines of the formula (2) is carried out by generally known methods. However, care must be taken that these aromatic amines, and the diazonium salts obtained therefrom, are not subjected to strongly alkaline conditions during processing.

The coupling of the diazotized amines with the coupling components of the formula (3) is preferably carried out in a pH range between 3 and 7, at temperatures between −5° and +30° C.

If a hydroxy group is present in the o-position relative to the azo bridges in the radicals of the diazo components, that is to say if R₁=OH, the dyestuffs are converted to the heavy metal complex dyestuffs by adding a heavy metal donor to the dyestuff solution or the dyestuff suspension, if necessary with an acid-binding agent and if necessary by treatment at elevated temperature (in general the reaction can be carried out at 0°–120° C.) until the conversion to the desired heavy metal complex dyestuff is complete.

Examples of heavy metal donors which can be used are: copper salts, such as copper sulfate, copper chloride, copper acetate or copper carbonate, chromium salts, such as chromium formate, chromium acetate, chromium sulfate, potash/chrome alum or chromium/salicylic acid, or cobalt salts, such as cobalt sulfate, cobalt chloride or a cobalt/tartaric acid complex.

Acid-binding agents used when converting the dyestuffs to the heavy metal complex dyestuffs are preferably alkali metal salts of weak inorganic or organic acids, such as sodium carbonate, sodium bicarbonate or sodium acetate.

If R₁ is an alkoxy group, preferably a methoxy group, this can be converted by known methods, during the reaction to convert the dyestuff to the heavy metal complex dyestuff, preferably the copper complex dyestuff, to a hydroxy group and the latter can participate in the formation of the complex.

If R₁ is a hydrogen atom, this can be replaced by a hydroxy group under the conditions of oxidative coppering [Angew. Chem. 70, 232–238 (1958)], with simultaneous incorporation of the said hydroxy group into the complex compound. The oxidizing agents used are advantageously derivatives of hydrogen peroxide, such as sodium peroxide, salts of peroxysulfuric acid or salts or perboric acid, but preferably hydrogen peroxide itself. Advantageous reaction conditions in general lie at 20°–100° C. and pH values between 7 and 3.

The resulting dyestuffs of the formula (1) or their heavy metal complex compounds are separated off by generally known methods, either by precipitating from the reaction medium by means of electrolytes, such as, for example, sodium chloride or potassium chloride, or by evaporating the reaction solution, for example by spray-drying. If the latter method of isolating the dyestuff is chosen, it is advisable, before evaporating, to remove any amounts of sulfate which may be present in the solutions by precipitating these as gypsum and separating them off by filtration. In some cases, it can also be desirable to supply the dyestuff solution direct, if appropriate after adding buffer substances, as a liquid preparation for use in dyeing.

The present invention also relates to the dyeing and printing of cellulose and polyamide fiber materials with the dyestuffs according to the invention.

Cellulose fiber materials are understood as meaning preferably cotton and regenerated cellulose, but also other vegetable fibers, such as linen, hemp and jute. Polyamide fibers are to be understood as meaning both those of natural origin and those of synthetic origin, that is to say both wool and other animal hairs and silk and also polyamide 6,6, polyamide 6, polyamide 11 or polyamide 4.

The dyestuffs according to the invention can be applied to the said substrates by the application techniques known for reactive dyestuffs.

Thus, with these dyestuffs very good color yields are obtained on cellulose fibers by the exhaustion method from a long liquor, using very diverse alkali additives.

Excellent color yields are also obtained on cellulose fibers by the pad method, and the dyes can be fixed by a residence time at room temperature, by steaming or with dry heat.

Intense prints with outlines in a good state and a clear white ground are also obtained by the conventional printing processes for cellulose fibers—in a single phase in the presence of sodium bicarbonate or other acid-binding agents in the printing paste with subsequent steaming at 101°–103° C. or in two phases, printing with a neutral or weakly acid printing paste and then either passing through a hot electrolyte-containing alkaline bath or over-padding with an alkaline electrolyte-containing padding liquor and then developing by means of a residence time, steaming or dry heat. The appearance of the prints is only slightly dependent on changing fixing conditions. Both in dyeing and in printing, the degrees of fixation obtained with the dyestuffs according to the invention are exceptionally high.

With regard to the coloristic properties of the dyestuffs according to the invention, it must be emphasized in particular that these dyestuffs are distinguished by good stability in printing pastes and padding liquors, including in the presence of alkali, by a very good uptake from a long liquor, by good color build-up by the conventional dyeing and printing processes, by an identical depth of shade when dyeing on cotton and regenerated cellulose fibers, by levelness of the dyeings and prints produced therewith and also by a uniform appearance of the dyeings from a long liquor on the addition of various amounts of electrolytes, such as sodium sulfate or sodium chloride.

The fastness properties of the dyeings and prints obtained with the aid of the dyestuffs according to the invention, especially those on cellulose fibers, are appreciable. This equally applies in the case of the most important fastnesses to processing and fastness properties in use. The fastness to light, the fastness to wet processing, such as fastness to washing, fastness to milling, fastness to water and fastness to seawater, and the fastness to ironing and fastness to rubbing should be mentioned in particular.

The dyeings on polyamide fibers are usually carried out from an acid medium. Thus, for example, acetic acid or acetic acid and ammonium acetate can be added to the dyebath in order to obtain the desired pH value. In order to obtain a usable levelness of the dyeings, it is advisable to add conventional levelling agents, for example those based on a reaction product of cyanuric chloride with three times the molar amount of an aminobenzenesulfonic acid and/or of an aminonaphthalenesulfonic acid and/or those based on a reaction product of, for example, stearylamine with ethylene oxide. The dyeings can be carried out either at the boil or at 110° to 120° C.

The examples which follow serve to illustrate the invention. The relationship between parts by weight and parts by volume is the same as that between kilogram and liter. The percentages are by weight unless stated otherwise.

EXAMPLE 1

97 parts by weight of cyanuric chloride are dissolved in 300 parts by volume of warm acetone and the solution is allowed to run into 2,500 parts by volume of water at 10° to 15° C., with stirring. Immediately thereafter, a solution of 156 parts by weight of 95.7% 1-(4'-amino-2'-sulfophenyl)-pyrazol-5-one-3-carboxylic acid in 750 parts by volume of water and 99 parts by volume of aqueous 33% sodium hydroxide solution, to which 65 parts by weight of crystalline sodium acetate have been added, is added and the mixture is then stirred at 17°-20° C. for 10 minutes. A solution of 152 parts by weight of 95.7% 1-(4'-amino-2'-sulfophenyl)-pyrazol-5-one-3-carboxylic acid in 750 parts by volume of water and 99 parts by volume of aqueous 33% sodium hydroxide solution, to which 150 parts by weight of crystalline sodium acetate have been added, is then added and the mixture is stirred for at least one hour at 20°-25° C.

This solution of the coupling component is added to the diazonium salt solution which is obtained as follows:

298 parts by weight of 4-β-sulfatoethylsulfonylaniline (94.5%) are suspended in 1,400 parts by volume of water and 600 parts by weight of ice and dissolved by adding 75 g of anhydrous sodium carbonate. 205 parts by volume of aqueous 5 N sodium nitrite solution are then added, 10 parts by weight of kieselguhr are added and the solution is clarified. The filtrate is allowed to run into a mixture of 260 parts by volume of aqueous 31% hydrochloric acid and 1,500 parts by weight of ice, the resulting mixture is stirred for one hour at 0°-5° C., a small excess of nitrous acid is destroyed with a little amidosulfonic acid and the solution is then neutralized by adding 33 parts by weight of sodium bicarbonate.

After the solution of the coupling component has been added, the pH is adjusted to 5.5-6.0 with sodium bicarbonate and the coupling reaction is carried out for several hours at this pH value and at 15°-20° C.

The reaction mixture is then warmed to 60°-65° C., 50 parts by weight of kieselguhr are added and the solution is clarified. Potassium chloride is added to the filtrate and the dyestuff which has precipitated is filtered off, washed with aqueous 20% potassium chloride solution, dried and ground. This gives 940 parts by weight of a yellow dyestuff powder which contains 65% of the dyestuff of the formula

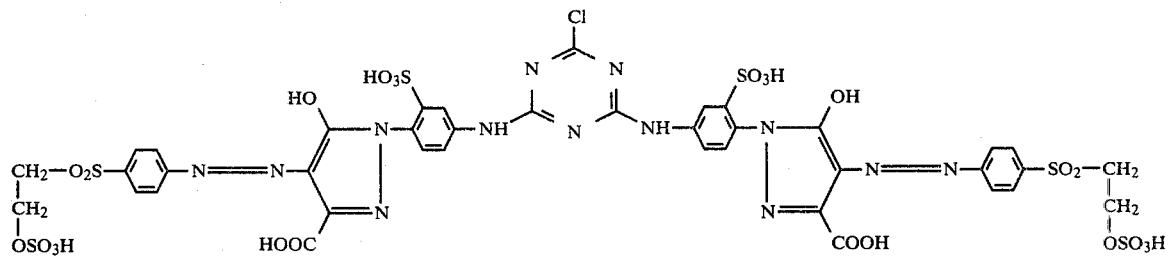

Intense clear yellow prints and dyeings with very good general fastness properties are obtained with this dyestuff on cellulose fiber materials by the methods of application customary for reactive dyestuffs.

EXAMPLE 2

97 parts by weight of cyanuric chloride are dissolved in 300 parts by volume of hot acetone and the solution is then allowed to run into 2,500 parts by volume of water at 10°-15° C., with stirring. Immediately thereafter a neutral solution of 136 parts by weight of 1-amino-4-N-acetoacetylamino-benzene-2-sulfonic acid in about 800 parts by volume of water and 65 parts by weight of crystalline sodium acetate are added and the mixture is stirred for 10 minutes at 18°-20° C. A further neutral solution of 136 parts by weight of 1-amino-4-N-acetoacetylamino-benzene-2-sulfonic acid in 800 parts by volume of water and 150 parts by weight of crystalline sodium acetate are then added and the resulting mixture is stirred for several hours at 25°–30° C.

352 parts by weight of 2,5-dimethoxyaniline-4-β-sulfatoethylsulfone are suspended in 1,400 parts by volume of water and 600 parts by weight of ice and dissolved to give a neutral solution by adding 80 parts by weight of calcined sodium carbonate. 205 parts by volume of aqueous 5 N sodium nitrite solution are added, 10 parts by weight of kieselguhr are stirred in and the solution is clarified. The filtrate is allowed to run dropwise into a mixture of 260 parts by volume of aqueous 31% hydrochloric acid and 1,500 parts by weight of ice, with stirring, at 0°–5° C. After 30 minutes, an excess of nitrous acid is destroyed by means of amidosulfonic acid and the pH is then adjusted to 5.5–6.0 with about 90 parts by weight of sodium bicarbonate.

After adding the solution of the coupling component described above, the coupling reaction is carried out for 15 hours at 10°–15° C., the pH value being kept at 5.7–6.2 by adding about 147 parts by weight of sodium bicarbonate. 50 parts by weight of kieselguhr are then added and the mixture is stirred a little and clarified. The dyestuff is precipitated by adding potassium chloride and is filtered off, washed with aqueous 20% potassium chloride solution, dried and ground. This gives 1,219 parts by weight of a yellow dyestuff powder which contains 53% of the dyestuff of the formula

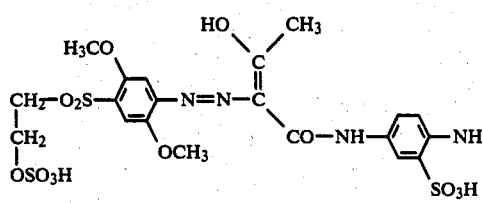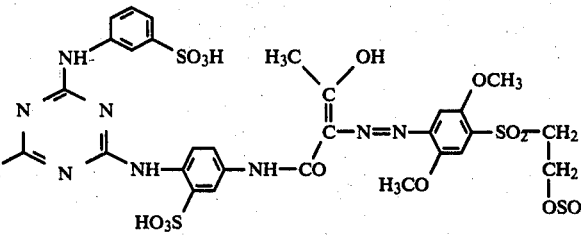

reflux for several hours at pH 6.5–7.0 and the coupling reaction and isolation of the dyestuff are then further carried out as described in Example 2, the dyestuff of the formula is obtained, which has coloristic properties similar to those described in Example 2.

EXAMPLE 4

A solution of 95 parts by weight of cyanuric chloride in 300 parts by volume of acetone is added at room temperature to a neutral solution of 591 parts by weight of the dyestuff of the formula

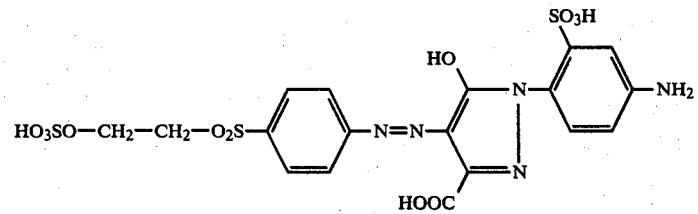

in the form of its sodium salt, in 6,000 parts by volume of water and the mixture is then stirred for 4 hours at 40° C. at a pH value of 6.8–7.0, the pH value being maintained by adding sodium bicarbonate in portions. After the reaction has ended, the dyestuff is precipitated by adding potassium chloride and is filtered off, dried and ground.

In respect of its constitution and in respect of its properties, it corresponds to the dyestuff described in Example 1.

EXAMPLE 5

185 parts by weight of cyanuric chloride are dissolved in 600 parts by volume of acetone at about 50° C. and the solution is then allowed to run, at 0° into a solution of 207 parts by weight of the disodium salt of

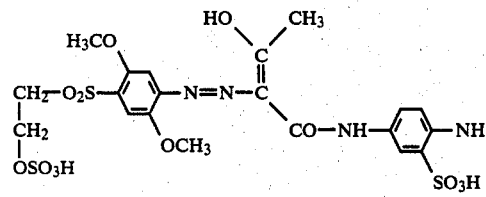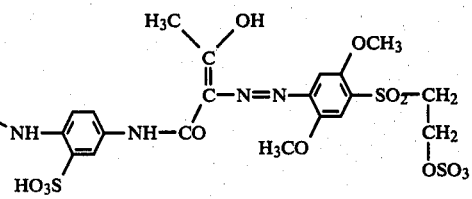

The dyestuff dyes and prints a clear yellow of very good general fastness properties on cotton fabric by the methods of application customary for reactive dyestuffs.

EXAMPLE 3

If 89 parts by weight of aniline-3-sulfonic acid are added to the solution of the coupling component prepared as in Example 2, the mixture is then boiled under 4,4'-diaminostilbene-2,2'-disulfonic acid in 3,000 parts by volume of water, with stirring. The hydrochloric acid formed is neutralized by adding a solution of 100 parts by weight of calcined sodium carbonate in 500 parts by volume of water. After the reaction has ended, a neutral solution of 312 parts by weight of 95.7% 1-(4'-amino-2'-sulfophenyl)-pyrazol-5-one-3-carboxylic acid in water is added and the pH is adjusted to 6.8–7.0 by adding sodium bicarbonate. The mixture is stirred at this pH value for several hours at 25°–30° C. and is then coupled at pH 5.5–6.0 with the diazonium salt solution described in Example 1. After coupling has taken place, the dyestuff is isolated by precipitating with potassium chloride, filtering off, drying and grinding. This gives 1,739 parts by weight of a yellow dyestuff powder which contains 46% of the dyestuff of the formula The same dyestuff can be obtained when 739 parts by weight of the dyestuff of the formula

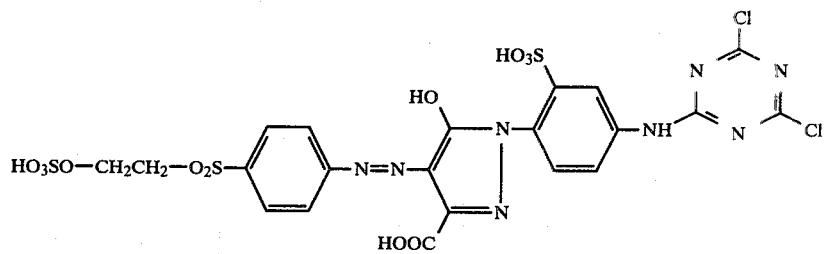

in the form of its trisodium salt, are subjected to a condensation reaction in a neutral aqueous medium with a solution of 207 parts by weight of the disodium salt of 4,4'-diaminostilbene-2,2'-disulfonic acid at elevated temperature and pH 6.8–7.0.

The dyestuffs listed in Table 1 which follows can be prepared in a manner similar to that described in Examples 1 to 5.

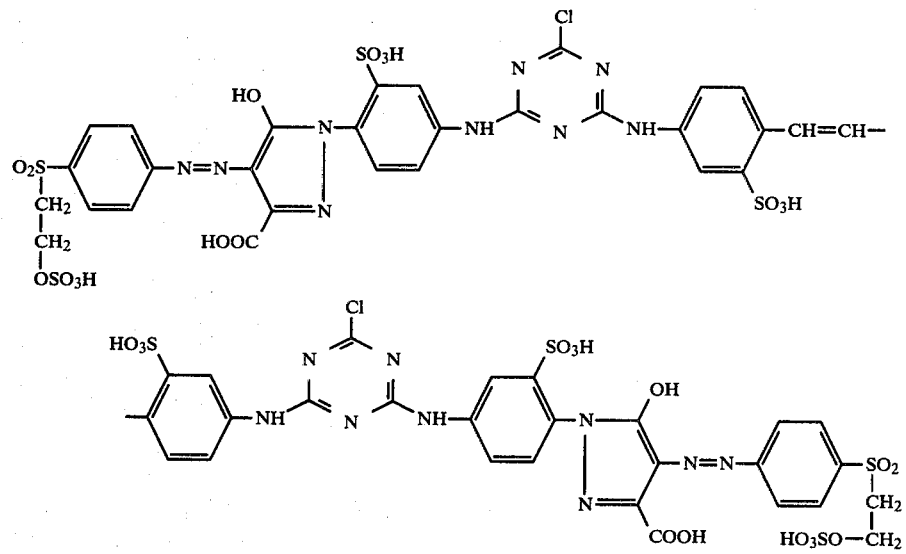

and with which intense yellow dyeings with good general fastness properties are obtained on cellulose fibers.

TABLE 1

| Example | Diazo Component | Coupling component | Color shade on cotton |
|---|---|---|---|
| 6 | 2 moles of aniline-4-β-thiosulfato-ethylsulfone | Secondary condensation product of 1 mole of cyanuric chloride and 2 moles of 1-(4'-amino-2'-sulfo-phenyl)-pyrazol-5-one-3-carboxylic acid | yellow |
| 7 | 2 moles of aniline-4-β-chloroethyl-sulfone | Secondary condensation product of 1 mole of cyanuric chloride and 2 moles of 1-(4'-amino-2'-sulfo-phenyl)-pyrazol-5-one-3-carboxylic acid | yellow |
| 8 | 2 moles of aniline-4-vinylsulfone | Secondary condensation product of 1 mole of cyanuric chloride and 2 moles of 1-(4'-amino-2'-sulfo-phenyl)-pyrazol-5-one-3-carboxylic acid | yellow |
| 9 | 2 moles of aniline-3-β-sulfato-ethylsulfone | Secondary condensation product of 1 mole of cyanuric chloride and 2 moles of 1-(4'-amino-2'-sulfo-phenyl)-pyrazol-5-one-3-carboxylic acid | yellow |
| 10 | 2 moles of 2-aminoanisole-4-β-sulfato- | Secondary condensation product | reddish- |

TABLE 1-continued

| Example | Diazo Component | Coupling component | Color shade on cotton |
|---|---|---|---|
| | ethylsulfone | of 1 mole of cyanuric chloride and 2 moles of 1-(4'-amino-2'-sulfo-phenyl)-pyrazol-5-one-3-carboxylic acid | tinged yellow |
| 11 | 2 moles of 2-methoxy-5-methylaniline-4-β-sulfatoethylsulfone | Secondary condensation product of 1 mole of cyanuric chloride and 2 moles of 1-(4'-amino-2'-sulfo-phenyl)-pyrazol-5-one-3-carboxylic acid | reddish-tinged yellow |
| 12 | 2 moles of 2-bromoaniline-4-β-sulfatoethylsulfone | Secondary condensation product of 1 mole of cyanuric chloride and 2 moles of 1-(4'-amino-2'-sulfo-phenyl)-pyrazol-5-one-3-carboxylic acid | yellow |
| 13 | 2 moles of 2-aminotoluene-4-β-sulfatoethylsulfone | Secondary condensation product of 1 mole of cyanuric chloride and 2 moles of 1-(4'-amino-2'-sulfo-phenyl)-pyrazol-5-one-3-carboxylic acid | yellow |
| 14 | 2 moles of 2,6-dimethylaniline-4-β-sulfatoethylsulfone | Secondary condensation product of 1 mole of cyanuric chloride and 2 moles of 1-(4'-amino-2'-sulfo-phenyl)-pyrazol-5-one-3-carboxylic acid | yellow |
| 15 | 2 moles of 4-β-sulfatoethylsulfonyl-aniline-2-sulfonic acid | Secondary condensation product of 1 mole of cyanuric chloride and 2 moles of 1-(4'-amino-2'-sulfo-phenyl)-pyrazol-5-one-3-carboxylic acid | yellow |
| 16 | 2 moles of 2,5-dimethoxyaniline-4-β-sulfatoethylsulfone | Secondary condensation product of 1 mole of cyanuric chloride and 2 moles of 1-(4'-amino-2'-sulfo-phenyl)-pyrazol-5-one-3-carboxylic acid | yellowish-tinged orange |
| 17 | 2 moles of 2-aminoanisole-5-β-sulfatoethylsulfone | Secondary condensation product of 1 mole of cyanuric chloride and 2 moles of 1-(4'-amino-2'-sulfo-phenyl)-pyrazol-5-one-3-carboxylic acid | reddish-tinged yellow |
| 18 | 2 moles of 2,4-dimethoxyaniline-5-β-sulfatoethylsulfone | Secondary condensation product of 1 mole of cyanuric chloride and 2 moles of 1-(4'-amino-2'-sulfo-phenyl)-pyrazol-5-one-3-carboxylic acid | yellowish-tinged orange |
| 19 | 2 moles of 4-aminoanisole-2-β-sulfatoethylsulfone | Secondary condensation product of 1 mole of cyanuric chloride and 2 moles of 1-(4'-amino-2'-sulfo-phenyl)-pyrazol-5-one-3-carboxylic acid | reddish-tinged yellow |
| 20 | 2 moles of 4-aminotoluene-2-β-sulfatoethylsulfone | Secondary condensation prouduct of 1 mole of cyanuric chloride and 2 moles of 1-(4'-amino-2'-sulfo-phenyl)-pyrazol-5-one-3-carboxylic acid | yellow |
| 21 | 2 moles of 2,6-dimethylaniline-3-β-sulfatoethylsulfone | Secondary condensation product of 1 mole of cyanuric chloride and 2 moles of 1-(4'-amino-2'-sulfo-phenyl)-pyrazol-5-one-3-carboxylic acid | yellow |
| 22 | 2 moles of 2-chloroaniline-5-β-sulfatoethylsulfone | Secondary condensation product of 1 mole of cyanuric chloride and 2 moles of 1-(4'-amino-2'-sulfo-phenyl)-pyrazol-5-one-3-carboxylic acid | yellow |
| 23 | 2 moles of 2-naphthylamine-8-β-sulfatoethylsulfone | Secondary condensation product of 1 mole of cyanuric chloride and 2 moles of 1-(4'-amino-2'-sulfo-phenyl)-pyrazol-5-one-3-carboxylic acid | reddish-tinged yellow |
| 24 | 2 moles of 8-β-sulfatoethylsulfonyl-2-amino-naphthalene-6-sulfonic acid | Secondary condensation product of 1 mole of cyanuric chloride and 2 moles of 1-(4'-amino-2'-sulfo-phenyl)-pyrazol-5-one-3-carboxylic acid | reddish-tinged yellow |
| 25 | 2 moles of 6-β-sulfatoethylsulfonyl-2-amino-naphthalene-1-sulfonic acid | Secondary condensation product of 1 mole of cyanuric chloride and 2 moles of 1-(4'-amino-2'-sulfo-phenyl)-pyrazol-5-one-3-carboxylic acid | yellow |

TABLE 1-continued

| Example | Diazo Component | Coupling component | Color shade on cotton |
|---|---|---|---|
| 26 | 2 moles of 2-aminoanisole-4-β-thiosulfatoethylsulfone | Secondary condensation product of 1 mole of cyanuric chloride and 2 moles of 1-(4'-amino-2'-sulfo-phenyl)-pyrazol-5-one-3-carboxylic acid | reddish-tinged yellow |
| 27 | 2 moles of 2-aminoanisole-4-vinylsulfone | Secondary condensation product of 1 mole of cyanuric chloride and 2 moles of 1-(4'-amino-2'-sulfo-phenyl)-pyrazol-5-one-3-carboxylic acid | reddish-tinged yellow |
| 28 | 2 moles of aniline-4-β-sulfatoethylsulfone | Secondary condensation product of 1 mole of cyanuric chloride and 2 moles of 1-(5'-amino-2'-sulfophenyl)-pyrazol-5-one-3-carboxylic acid | yellow |
| 29 | 2 moles of aniline-4-β-thiosulfatoethylsulfone | Secondary condensation product of 1 mole of cyanuric chloride and 2 moles of 1-(5'-amino-2'-sulfophenyl)-pyrazol-5-one-3-carboxylic acid | yellow |
| 30 | 2 moles of aniline-3-vinylsulfone | Secondary condensation product of 1 mole of cyanuric chloride and 2 moles of 1-(5'-amino-2'-sulfophenyl)-pyrazol-5-one-3-carboxylic acid | yellow |
| 31 | 2 moles of 2-aminoanisole-4-β-sulfatoethylsulfone | Secondary condensation product of 1 mole of cyanuric chloride and 2 moles of 1-(5'-amino-2'-sulfophenyl)-pyrazol-5-one-3-carboxylic acid | reddish-tinged yellow |
| 32 | 2 moles of 2-aminotoluene-4-β-sulfatoethylsulfone | Secondary condensation product of 1 mole of cyanuric chloride and 2 moles of 1-(5'-amino-2'-sulfophenyl)-pyrazol-5-one-3-carboxylic acid | yellow |
| 33 | 2 moles of 2,5-dimethoxyaniline-4-β-sulfatoethylsulfone | Secondary condensation product of 1 mole of cyanuric chloride and 2 moles of 1-(5'-amino-2'-sulfophenyl)-pyrazol-5-one-3-carboxylic acid | yellowish-tinged orange |
| 34 | 2 moles of 2,4-dimethoxyaniline-5-β-sulfatoethylsulfone | Secondary condensation product of 1 mole of cyanuric chloride and 2 moles of 1-(5'-amino-2'-sulfophenyl)-pyrazol-5-one-3-carboxylic acid | yellowish-tinged orange |
| 35 | 2 moles of 2-methoxy-5-methyl-4-β-sulfatoethylsulfone | Secondary condensation product of 1 mole of cyanuric chloride and 2 moles of 1-(5'-amino-2'-sulfophenyl)-pyrazol-5-one-3-carboxylic acid | reddish-tinged yellow |
| 36 | 2 moles of 2-naphthylamine-6-β-sulfatoethylsulfone | Secondary condensation product of 1 mole of cyanuric chloride and 2 moles of 1-(5'-amino-2'-sulfophenyl)-pyrazol-5-one-3-carboxylic acid | yellow |
| 37 | 2 moles of 6-β-sulfatoethylsulfonyl-2-amino-naphthalene-1-sulfonic acid | Secondary condensation product of 1 mole of cyanuric chloride and 2 moles of 1-(5'-amino-2'-sulfophenyl)-pyrazol-5-one-3-carboxylic acid | yellow |
| 38 | 2 moles of 8-β-sulfatoethylsulfonyl-2-amino-naphthalene-6-sulfonic acid | Secondary condensation product of 1 mole of cyanuric chloride and 2 moles of 1-(5'-amino-2'-sulfophenyl)-pyrazol-5-one-3-carboxylic acid | reddish-tinged yellow |
| 39 | 2 moles of aniline-4-β-sulfatoethylsulfone | Secondary condensation product of 1 mole of cyanuric chloride and 2 moles of 1-(4'-aminophenyl-)-3-methyl-pyrazol-5-one | yellow |
| 40 | 2 moles of 2-aminoanisole-4-β-sulfatoethylsulfone | Secondary condensation product of 1 mole of cyanuric chloride and 2 moles of 1-(4'-aminophenyl-)-3-methyl-pyrazol-5-one | reddish-tinged yellow |
| 41 | 2 moles of 2-aminotoluene-4-β-sulfatoethylsulfone | Secondary condensation product of 1 mole of cyanuric chloride and 2 moles of 1-(4'-aminophenyl-)-3-methyl-pyrazol-5-one | yellow |
| 42 | 2 moles of aniline-3-β-sulfatoethylsulfone | Secondary condensation product of 1 mole of cyanuric bromide | yellow |

TABLE 1-continued

| Example | Diazo Component | Coupling component | Color shade on cotton |
|---|---|---|---|
| | | and 2 moles of 1-(4'-amino-2'-sulfophenyl)-pyrazol-5-one-3-carboxylic acid | |
| 43 | 2 moles of aniline-4-β-sulfatoethylsulfone | Secondary condensation product of 1 mole of cyanuric bromide and 2 moles of 1-(4'-amino-2'-sulfophenyl)-pyrazol-5-one-3-carboxylic acid | yellow |
| 44 | 2 moles of aniline-4-β-thiosulfatoethylsulfone | Secondary condensation product of 1 mole of cyanuric fluoride and 2 moles of 1-(5'-amino-2'-sulfophenyl)-pyrazol-5-one-3-carboxylic acid | yellow |
| 45 | 2 moles of aniline-4-β-sulfatoethylsulfone | Secondary condensation product of 1 mole of cyanuric fluoride and 2 moles of 1-(5'-amino-2'-sulfophenyl)-pyrazol-5-one-3-carboxylic acid | yellow |
| 46 | 2 moles of aniline-3-β-sulfatoethylsulfone | Secondary condensation product of 1 mole of cyanuric chloride and 2 moles of 1-(5'-amino-2'-methyl-3-'-sulfo-phenyl)-pyrazol-5-one-3-carboxylic acid | yellow |
| 47 | 2 moles of aniline-4-β-sulfatoethylsulfone | Secondary condensation product of 1 mole of cyanuric chloride and 2 moles of 1-(5'-amino-2'-methyl-3-'-sulfo-phenyl)-pyrazol-5-one-3-carboxylic acid | yellow |
| 48 | 2 moles of 2-aminoanisole-4-β-sulfatoethylsulfone | Secondary condensation product of 1 mole of cyanuric chloride and 2 moles of 1-(5'-amino-2'-methyl-3-'-sulfo-phenyl)-pyrazol-5-one-3-carboxylic acid | yellow |
| 49 | 2 moles of 2-aminoanisole-4-β-sulfatoethylsulfone | Secondary condensation product of 1 mole of cyanuric chloride and 2 moles of 1-(4'-amino-7'-sulfo-naphth-1'-yl)-pyrazol-5-one-3-carboxylic acid | reddish-tinged yellow |
| 50 | 2 moles of 2,5-dimethoxyaniline-4-β-sulfatoethylsulfone | Secondary condensation product of 1 mole of cyanuric chloride and 2 moles of 1-(4'-amino-7'-sulfo-naphth-1'-yl)-pyrazol-5-one-3-carboxylic acid | reddish-tinged orange |
| 51 | 2 moles of 2-aminotoluene-4-β-sulfatoethylsulfone | Secondary condensation product of 1 mole of cyanuric chloride and 2 moles of methyl 1-(4'-amino-2'-sulfo-phenyl)-pyrazol-5-one-3-carboxylate | yellow |
| 52 | 2 moles of aniline-4-β-sulfatoethylsulfone | Secondary condensation product of 1 mole of cyanuric chloride and 2 moles of methyl 1-(4'-amino-2'-sulfo-phenyl)-pyrazol-5-one-3-carboxylate | yellow |
| 53 | 2 moles of 5-methyl-2-methoxyaniline-4-β-sulfatoethylsulfone | Tertiary condensation product of 1 mole of cyanuric chloride, 2 moles of methyl 1-(4'-methyl-5'-amino-2'-sulfophenyl)-pyrazol-5-one-3-carboxylic acid and 1 mole of methyltaurine | yellowish-tinged orange |
| 54 | 2 moles of aniline-4-β-sulfatoethylsulfone | Tertiary condensation product of 1 mole of cyanuric chloride, 2 moles of methyl 1-(4'-methyl-5'-amino-2'-sulfophenyl)-pyrazol-5-one-3-carboxylic acid and 1 mole of methyltaurine | yellow |
| 55 | 2 moles of 5-β-sulfatoethylsulfonyl-aniline-2-sulfonic acid | Tertiary condensation product of 1 mole of cyanuric chloride, 2 moles of 1-(5'-methyl-4'-amino-2'-sulfophenyl)-pyrazol-5-one-3-carboxylic acid and 1 mole of ammonia | yellow |
| 56 | 2 moles of aniline-3-β-sulfatoethylsulfone | Tertiary condensation product of 1 mole of cyanuric chloride, 2 moles of 1-(5'-methyl-4'-amino-2'-sulfophenyl)-pyrazol-5-one-3-carboxylic acid and 1 mole of ammonia | yellow |
| 57 | 2 moles of aniline-4-β-sulfatoethylsulfone | Tertiary condensation product of 1 mole of cyanuric chloride, | yellow |

TABLE 1-continued

| Example | Diazo Component | Coupling component | Color shade on cotton |
|---|---|---|---|
| | | 2 moles of 1-(4'-amino-6'-sulfo-naphth-1'-yl)-pyrazol-5-one-3-carboxylic acid and 1 mole of morpholine | |
| 58 | 2 moles of 2-aminoanisole-4-β-sulfatoethylsulfone | Tertiary condensation product of 1 mole of cyanuric chloride, 2 moles of 1-(4'-amino-6'-sulfo-naphth-1'-yl)-pyrazol-5-one-3-carboxylic acid and 1 mole of morpholine | reddish-tinged yellow |
| 59 | 2 moles of aniline-4-β-sulfatoethylsulfone | Reaction product of 2 moles of the primary condensation product obtained from equimolar amounts of cyanuric chloride and 1-(4'-amino-2'-sulfophenyl)-pyrazol-5-one-3-carboxylic acid with 1 mole of 4',4'-diamino-diphenyl-amine-2-sulfonic acid | yellow |
| 60 | 2 moles of aniline-3-β-sulfatoethylsulfone | Reaction product of 2 moles of the primary condensation product obtained from equimolar amounts of cyanuric chloride and 1-(4'-amino-2'-sulfophenyl)-pyrazol-5-one-3-carboxylic acid with 1 mole of 4',4'-diamino-diphenyl-amine-2-sulfonic acid | yellow |
| 61 | 2 moles of aniline-4-β-sulfatoethylsulfone | Reaction product of 2 moles of the primary condensation product obtained from equimolar amounts of cyanuric chloride and 1-(4'-amino-2'-sulfophenyl)-pyrazol-5-one-3-carboxylic acid with 1 mole of 1-(4'-amino-benzoylamino)-4-aminobenzene-3-sulfonic acid | yellow |
| 62 | 2 moles of 2-aminoanisole-4-β-sulfatoethylsulfone | Reaction product of 2 moles of the primary condensation product obtained from equimolar amounts of cyanuric chloride and 1-(4'-amino-2'-sulfophenyl)-pyrazol-5-one-3-carboxylic acid with 1 mole of 1-(4'-amino-benzoylamino)-4-aminobenzene-3-sulfonic acid | reddish-tinged yellow |
| 63 | 2 moles of aniline-4-β-sulfatoethylsulfone | Reaction product of 2 moles of the primary condensation product obtained from equimolar amounts of cyanuric chloride and 1-(4'-amino-2'-sulfo-phenyl)-pyrazol-5-one-3-carboxylic acid with 1 mole of 4,4'-diamino-diphenylurea-3,3'-disulfonic acid | yellow |
| 64 | 2 moles of 2-aminotoluene-4-β-sulfatoethylsulfone | Reaction product of 2 moles of the primary condensation product obtained from equimolar amounts of cyanuric chloride and 1-(4'-amino-2'-sulfo-phenyl)-pyrazol-5-one-3-carboxylic acid with 1 mole of 4,4'-diamino-diphenylurea-3,3'-disulfonic acid | yellow |
| 65 | 2 moles of 2,5-dimethoxy-aniline-4-β-sulfatoethylsulfone | Reaction product of 2 moles of the primary condensation product obtained from equimolar amounts of cyanuric chloride and 1-(5'-amino-2'-sulfo-phenyl)-pyrazol-5-one-3-carboxylic acid with 1 mole of 4,4'-diamino-3,3'-dimethyl-diphenyl-5,5'-disulfonic acid | orange |
| 66 | 2 moles of 2-methoxy-5-methyl-aniline-4-β-sulfatoethylsulfone | Reaction product of 2 moles of the primary condensation product obtained from equimolar amounts of cyanuric chloride and 1-(5'-amino-2'-sulfo-phenyl)-pyrazol-5-one-3-carboxylic acid with 1 mole of 4,4'-diamino-3,3'-dimethyl-diphenyl-5,5'-disulfonic acid | yellowish-tinged orange |
| 67 | 2 moles of aniline-4-β-sulfatoethylsulfone | Reaction product of 2 moles of the primary condensation product obtained from equimolar | yellow |

TABLE 1-continued

| Example | Diazo Component | Coupling component | Color shade on cotton |
|---|---|---|---|
| | | amounts of cyanuric chloride and 1-(4'-amino-2'-sulfo-phenyl)-pyrazol-5-one-3-carboxylic acid with 1 mole of 1,1-bis-(4'-amino-3'-methyl-phenyl)-cyclohexane | |
| 68 | 2 moles of 2,5-dimethoxyaniline-4-β-sulfatoethylsulfone | Reaction product of 2 moles of the primary condensation product obtained from equimolar amounts of cyanuric chloride and 1-(4'-amino-2'-sulfo-phenyl)-pyrazol-5-one-3-carboxylic acid with 1 mole of 1,1-bis-(4'-amino-3'-methyl-phenyl)-cyclohexane | orange |
| 69 | 2 moles of aniline-3-β-sulfato-ethylsulfone | Reaction product of 2 moles of the primary condensation product obtained from equimolar amounts of cyanuric chloride and ethyl 1-(5'-amino-2'-sulfo-phenyl)-pyrazol-5-one-3-carboxylate with 1 mole of 4,4'-diamino-diphenyl ether-2-sulfonic acid | yellow |
| 70 | 2 moles of 5-methyl-2-methoxy-aniline-4-β-sulfatoethylsulfone | Reaction product of 2 moles of the primary condensation product obtained from equimolar amounts of cyanuric chloride and ethyl 1-(5'-amino-2'-sulfo-phenyl)-pyrazol-5-one-3-carboxylate with 1 mole of 4,4'-diamino-diphenyl ether-2-sulfonic acid | reddish-tinged yellow |
| 71 | 2 moles of aniline-4-β-thiosulfatoethylsulfone | Reaction product of 2 moles of the primary condensation product obtained from equimolar amounts of cyanuric chloride and 1-(4'-aminophenyl)-3-methyl-pyrazol-5-one with 1 mole of 4,4'-diamino-diphenyl sulfide-2,2'-disulfonic acid | yellow |
| 72 | 2 moles of 8-β-sulfatoethylsulfonyl-2-amino-naphthalene-6-sulfonic acid | Reaction product of 2 moles of the primary condensation product obtained from equimolar amounts of cyanuric chloride and 1-(4'-aminophenyl)-3-methyl-pyrazol-5-one with 1 mole of 4,4'-diamino-diphenyl sulfide-2,2'-disulfonic acid | reddish-tinged yellow |
| 73 | 2 moles of 2-aminoanisole-4-β-sulfatoethylsulfone | Reaction product of 2 moles of the primary condensation product obtained from equimolar amounts of cyanuric chloride and 1-(4'-amino-2'-sulfo-phenyl)-pyrazol-5-one-3 carboxylic acid with 1 mole of 1,2-bis-(4'-amino-phenoxy)-ethane | reddish-tinged yellow |
| 74 | 2 moles of 2-methoxy-5-methyl-aniline-4-β-sulfatoethylsulfone | Secondary condensation product of 1 mole of cyanuric chloride and 2 moles of 1-acetoacetyl-amino-4-aminobenzene-3-sulfonic acid | greenish-tinged yellow |
| 75 | 2 moles of 2-methoxy-5-methyl-aniline-4-β-chloroethylsulfone | Secondary condensation product of 1 mole of cyanuric chloride and 2 moles of 1-acetoacetyl-amino-4-aminobenzene-3-sulfonic acid | greenish-tinged yellow |
| 76 | 2 moles of 2-methoxy-5-methyl-aniline-4-vinylsulfone | Secondary condensation product of 1 mole of cyanuric chloride and 2 moles of 1-acetoacetyl-amino-4-aminobenzene-3-sulfonic acid | greenish-tinged yellow |
| 77 | 2 moles of 2-methoxy-5-methyl-aniline-4-β-thiosulfatoethylsulfone | Secondary condensation product of 1 mole of cyanuric chloride and 2 moles of 1-acetoacetyl-amino-4-aminobenzene-3-sulfonic acid | greenish-tinged yellow |
| 78 | 2 moles of 2,5-dimethoxy-aniline-4-vinylsulfone | Secondary condensation product of 1 mole of cyanuric chloride and 2 moles of 1-acetoacetyl-amino-4-aminobenzene-3-sulfonic acid | yellow |
| 79 | 2 moles of 2,5-dimethoxy-4-β-thio- | Secondary condensation product | yellow |

TABLE 1-continued

| Example | Diazo Component | Coupling component | Color shade on cotton |
|---|---|---|---|
| | sulfatoethylsulfone | of 1 mole of cyanuric chloride and 2 moles of 1-acetoacetyl-amino-4-aminobenzene-3-sulfonic acid | |
| 80 | 2 moles of 2,5-dimethoxy-4-β-chloro-ethylsulfone | Secondary condensation product of 1 mole of cyanuric chloride and 2 moles of 1-acetoacetyl-amino-4-aminobenzene-3-sulfonic acid | yellow |
| 81 | 2 moles of 2,5-dimethoxyaniline-4-β-sulfatoethylsulfone | Secondary condensation product of 1 mole of cyanuric chloride and 2 moles of 1-acetoacetyl-amino-4-amino-benzene-2,5-disulfonic acid | yellow |
| 82 | 2 moles of 2-methoxy-5-methylaniline 4-β-sulfatoethylsulfone | Secondary condensation product of 1 mole of cyanuric chloride and 2 moles of 1-acetoacetyl-amino-4-amino-benzene-2,5-disulfonic acid | greenish-tinged yellow |
| 83 | 2 moles of 2-aminoanisole-4-β-sulfatoethylsulfone | Secondary condensation product of 1 mole of cyanuric chloride and 2 moles of 1-acetoacetyl-amino-4-amino-benzene-2,5-disulfonic acid | greenish-tinged yellow |
| 84 | 2 moles of 2-aminoanisole-5-β-sulsulfatoethylsulfone | Secondary condensation product of 1 mole of cyanuric chloride and 2 moles of 1-acetoacetyl-amino-4-amino-benzene-2,5-disulfonic acid | greenish-tinged yellow |
| 85 | 2 moles of 2,4-dimethoxyaniline-5-β-sulfatoethylsulfone | Secondary condensation product of 1 mole of cyanuric chloride and 2 moles of 1-acetoacetyl-amino-2-methyl-4-amino-benzene-5-sulfonic acid | yellow |
| 86 | 2 moles of 2,5-dimethoxyaniline-4-β-sulfatoethylsulfone | Secondary condensation product of 1 mole of cyanuric chloride and 2 moles of 1-acetoacetyl-amino-2-methyl-4-amino-benzene-5-sulfonic acid | yellow |
| 87 | 2 moles of 8-β-sulfatoethylsulfonyl-2-amino-naphthalene-6-sulfonic acid | Secondary condensation product of 1 mole of cyanuric chloride and 2 moles of 1-acetoacetyl-amino-2-methyl-4-amino-benzene-5-sulfonic acid | yellow |
| 88 | 2 moles of 2,4-dimethoxyaniline-5-β-sulfatoethylsulfone | Tertiary condensation product of 1 mole of cyanuric chloride, 2 moles of 1-acetoacetylamino-4-amino-benzene-3-sulfonic acid and 1 mole of isopropyl alcohol | yellow |
| 89 | 2 moles of 2-methoxy-5-methylaniline-4-β-sulfatoethylsulfone | Tertiary condensation product of 1 mole of cyanuric chloride, 2 moles of 1-acetoacetylamino-4-amino-benzene-3-sulfonic acid and 1 mole of isopropyl alcohol | greenish-tinged yellow |
| 90 | 2 moles of 2,5-dimethoxyaniline-4-β-sulfatoethylsulfone | Tertiary condensation product of 1 mole of cyanuric chloride, 2 moles of 1-acetoacetylamino-4-amino-benzene-3-sulfonic acid and 1 mole of p-aminobenzoic acid | yellow |
| 91 | 2 moles of 2-aminoanisole-5-β-sulfatoethylsulfone | Tertiary condensation product of 1 mole of cyanuric chloride, 2 moles of 1-acetoacetylamino-4-amino-benzene-3-sulfonic acid and 1 mole of p-aminobenzoic acid | greenish-tinged yellow |
| 92 | 2 moles of 2,5-dimethoxyaniline-4-β-sulfatoethylsulfone | Tertiary condensation product of 1 mole of cyanuric chloride, 2 moles of 1-acetoacetylamino-4-amino-benzene-3-sulfonic acid and 1 mole of aniline-2,5-disulfonic acid | yellow |
| 93 | 2 moles of 2-methoxy-5-methyl-aniline-4-β-sulfatoethylsulfone | Tertiary condensation product of 1 mole of cyanuric chloride, 2 moles of 1-acetoacetylamino-4-aminobenzene-3-sulfonic acid and 1 mole of diethanolamine | greenish-tinged yellow |
| 94 | 2 moles of 2,5-dimethoxyaniline-4-β-sulfatoethylsulfone | Tertiary condensation product of 1 mole of cyanuric chloride, 2 moles of 1-acetoacetylamino-4-aminobenzene-3-sulfonic acid | yellow |

TABLE 1-continued

| Example | Diazo Component | Coupling component | Color shade on cotton |
|---|---|---|---|
| | | and 1 mole of diethanolamine | |
| 95 | 2 moles of 2-methoxy-5-methyl-aniline-4-β-sulfatoethylsulfone | Reaction product of 2 moles of the primary condensation product obtained from equimolar amounts of cyanuric chloride and 1-acetoacetylamino-4-amino-benzene-3-sulfonic acid with 1 mole of 4,4'-diamino-5-5'-dimethoxydiphenyl-2,2'-disulfonic acid | greenish-tinged yellow |
| 96 | 2 moles of 2-aminoanisole-5-β-sulfatoethylsulfone | Reaction product of 2 moles of the primary condensation product obtained from equimolar amounts of cyanuric chloride and 1-acetoacetylamino-4-amino-benzene-3-sulfonic acid with 1 mole of 4,4'-diamino-5-5'-dimethoxydiphenyl-2,2'-disulfonic acid | greenish-tinged yellow |
| 97 | 2 moles of 2-methoxy-5-methyl-aniline-4-β-sulfatoethylsulfone | Reaction product of 2 moles of the primary condensation product obtained from equimolar amounts of cyanuric chloride and 1-acetoacetylamino-4-amino-benzene-3-sulfonic acid with 1 mole of 2,7-diaminocarbazole | greenish-tinged yellow |
| 98 | 2 moles of 2,5-dimethoxyaniline-4-β-sulfatoethylsulfone | Reaction product of 2 moles of the primary condensation product obtained from equimolar amounts of cyanuric chloride and 1-acetoacetylamino-4-amino-benzene-3-sulfonic acid with 1 mole of 2,7-diaminocarbazole | yellow |
| 99 | 2 moles of 2-methoxy-5-methyl-aniline-4-β-sulfatoethylsulfone | Reaction product of 2 moles of the primary condensation product obtained from equimolar amounts of cyanuric chloride and 1-acetoacetylamino-4-amino-benzene-3-sulfonic acid with 1 mole of 2,7-diamino-diphenylenesulfone | greenish-tinged yellow |
| 100 | 2 moles of 2-aminoanisole-4-β-sulfatoethylsulfone | Reaction product of 2 moles of the primary condensation product obtained from equimolar amounts of cyanuric chloride and 1-acetoacetylamino-4-amino-benzene-3-sulfonic acid with 1 mole of 2,7-diamino-diphenylenesulfone | greenish-tinged yellow |
| 101 | 2 moles of 2,5-dimethoxy-aniline-4-β-sulfatoethylsulfone | Reaction product of 2 moles of the primary condensation product obtained from equimolar amounts of cyanuric chloride and 1-acetoacetylamino-4-amino-benzene-3-sulfonic acid with 1 mole of 3,3'-diaminodiphenylsulfone | yellow |
| 102 | 2 moles of 2-methoxy-5-methyl-aniline-4-β-sulfatoethylsulfone | Reaction product of 2 moles of the secondary condensation product obtained from equimolar amounts of cyanuric chloride, 1-acetoacetylamino-4-aminobenzene-3-sulfonic acid and β-sulfatoethylamine with 1 mole of 4,4'-diaminostilbene-2,2'-disulfonic acid | greenish-tinged yellow |
| 103 | 2 moles of 2-aminoanisole-5-β-sulfatoethylsulfone | Reaction product of 2 moles of the secondary condensation product obtained from equimolar amounts of cyanuric chloride, 1-acetoacetylamino-4-aminobenzene-3-sulfonic acid and β-sulfatoethylamine with 1 mole of 4,4'-diaminostilbene-2,2'-disulfonic acid | greenish-tinged yellow |
| 104 | 2 moles of 2-methoxy-5-methyl-aniline-4-β-sulfatoethylsulfone | Reaction product of 2 moles of the secondary condensation product obtained from equimolar amounts of cyanuric chloride, 1-acetoacetylamino-4-aminoben- | greenish-tinged yellow |

TABLE 1-continued

| Example | Diazo Component | Coupling component | Color shade on cotton |
|---|---|---|---|
| | | zene-3-sulfonic acid and ethylamine with 1 mole of 1,5-diaminonaphthalene | |
| 105 | 2 moles of 2,5-dimethoxyaniline-4-β-sulfatoethylsulfone | Reaction product of 2 moles of the secondary condensation product obtained from equimolar amounts of cyanuric chloride, 1-acetoacetylamino-4-aminobenzene-3-sulfonic acid and ethylamine with 1 mole of 1,5-diaminonaphthalene | yellow |
| 106 | 2 moles of 2-methoxy-5-methyl-aniline-4-β-sulfatoethylsulfone | Reaction product of 2 moles of the secondary condensation product obtained from equimolar amounts of cyanuric chloride, 1-acetoacetylamino-4-aminobenzene-3-sulfonic acid and β-mercaptoethanol with 1 mole of 1,3-diaminobenzene-4-sulfonic acid | greenish-tinged yellow |
| 107 | 2 moles of 2,5-dimethoxyaniline-4-β-sulfatoethylsulfone | Reaction product of 2 moles of the secondary condensation product obtained from equimolar amounts of cyanuric chloride, 1-acetoacetylamino-4-aminobenzene-3-sulfonic acid and β-mercaptoethanol with 1 mole of 1,3-diaminobenzene-4-sulfonic acid | yellow |
| 108 | 2 moles of 2-aminoanisole-4-β-sulfatoethylsulfone | Reaction product of 2 moles of the secondary condensation product obtained from equimolar amounts of cyanuric chloride, 1-acetoacetylamino-4-aminobenzene-3-sulfonic acid and aniline-3-sulfonic acid with 1 mole of 1,4-diaminobutane | greenish-tinged yellow |

EXAMPLE 109

97 parts by weight of cyanuric chloride are dissolved in 300 parts by volume of acetone at about 45° C. and the solution is allowed to run into 2,500 parts by volume of water at 10°-12° C., with stirring. Immediately thereafter, a neutral solution of 136 parts by weight of 1-acetoacetylamino-4-aminobenzene-3-sulfonic acid in about 800 parts by volume of water and 65 parts by weight of crystalline sodium acetate are added and the mixture is stirred for 10 minutes at 18°-20° C. A solution of 167 parts by weight of 89.7% 1-(5'-amino-2'-sulfophenyl)-pyrazol-5-one-3-carboxylic acid in 750 parts by volume of water, which has been neutralized by adding 100 parts by volume of 33% strength sodium hydroxide solution, and 150 parts by weight of crystalline sodium acetate are then added and the mixture is stirred for about 2 hours at 25°-30° C.

Coupling is carried out with the diazonium salt solution described in Example 2, the pH value being kept between 5.7 and 6.2. After 12 hours, the dyestuff solution is clarified at 60°-65° C. and the dyestuff is then salted out with sodium chloride, filtered off, dried at 60°-65° C. and ground. This gives 1,014 parts by weight of an orange dyestuff powder which contains 65% of the dyestuff of the formula

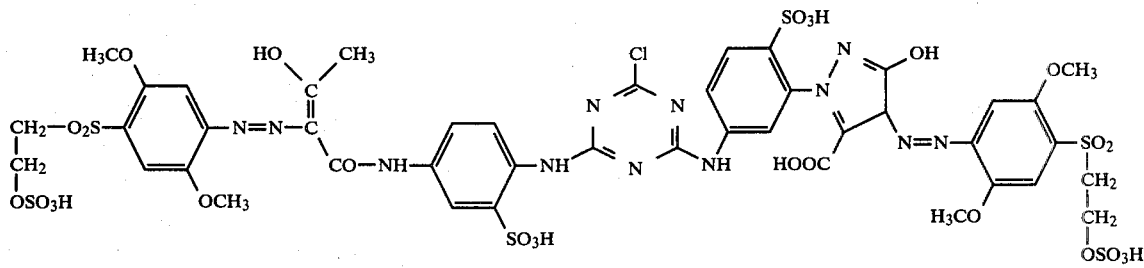

Golden yellow dyeings and prints with very good general fastness properties are obtained on cotton with the dyestuff.

EXAMPLE 110

97 parts by weight of cyanuric chloride are dissolved in acetone and the solution is allowed to run into water, as described in Example 109. A solution of 167 parts by weight of 1-(5'-amino-2'-sulfo-phenyl)-pyrazol-5-one-3-carboxylic acid (89.7% pure) in 750 parts by volume of water, which has been neutralized by adding 100 parts by volume of 33% strength sodium hydroxide solution, and 65 parts by weight of crystalline sodium acetate are added to this suspension and the resulting mixture is stirred for 15 minutes at 17°–20° C. A solution of 193 parts by weight of 1-amino-8-hydroxynaphthalene-3,6-disulfonic acid (80.2% pure) in 750 parts by volume of water and 45 parts by volume of sodium hydroxide solution (33% strength) and also 150 parts by weight of crystalline sodium acetate are then introduced and the mixture is stirred for 2–3 hours at 25°–30° C.

Coupling is carried out with the diazonium salt solution described in Example 1, the pH value being kept at 5.5–6.2. After 12 hours the dyestuff solution is warmed to 60°–65° C., clarified and evaporated to dryness in vacuo at 65° C. This gives 1,125 parts by weight of a brown dyestuff powder which is 55% pure in respect of the dyestuff of the formula

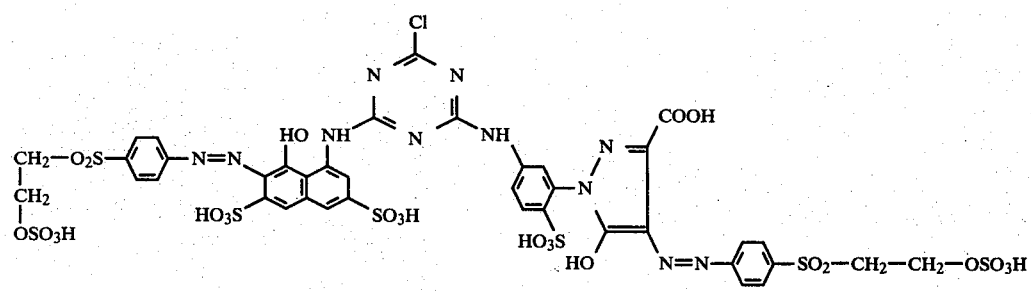

Intense orange-brown prints and dyeings with very good general fastness properties can be produced on cotton with the dyestuff.

The dyestuffs listed in Table 2 can be prepared in a manner similar to that described in the examples given:

TABLE 2

| Example | Diazo component | Coupling component | Color shade on cotton |
|---|---|---|---|
| 111 | 2 moles of 2-aminoanisole-4-β-sulfatoethylsulfone | Secondary condensation product of 1 mole of cyanuric chloride and 1 mole of 1-(4′-amino-2′-sulfophenyl)-pyrazol-5-one-3-carboxylic acid and 1 mole of 2-amino-5-naphthol-7-sulfonic acid | orange |
| 112 | 2 moles of aniline-4-β-sulfatoethylsulfone | Secondary condensation product of 1 mole of cyanuric chloride and 1 mole of 1-(4′-amino-2′-sulfophenyl)-pyrazol-5-one-3-carboxylic acid and 1 mole of 2-amino-5-naphthol-7-sulfonic acid | orange |
| 113 | 2 moles of 2-aminoanisole-4-β-sulfatoethylsulfone | Secondary condensation product of 1 mole of cyanuric chloride and 1 mole of 1-(4′-amino-2′-sulfophenyl)-pyrazol-5-one-3-carboxylic acid and 1 mole of 1-acetoacetylamino-4-aminobenzene-3-sulfonic acid | yellow |
| 114 | 2 moles of 2-methoxy-5-methyl-aniline-4-β-sulfatoethylsulfone | Secondary condensation product of 1 mole of cyanuric chloride and 1 mole of 1-(4′-amino-2′-sulfophenyl)-pyrazol-5-one-3-carboxylic acid and 1 mole of 1-acetoacetylamino-4-aminobenzene-3-sulfonic acid | yellow |
| 115 | 2 moles of 2-aminoanisole-4-β-sulfatoethylsulfone | Secondary condensation product of 1 mole of cyanuric chloride and 1 mole of 1-(4′-amino-2′-sulfophenyl)-pyrazol-5-one-3-carboxylic acid and 1 mole of 1-acetoacetylamino-4-aminobenzene-2,5-disulfonic acid | yellow |
| 116 | 2 moles of 2-aminoanisole-5-β-sulfatoethylsulfone | Secondary condensation product of 1 mole of cyanuric chloride and 1 mole of 1-(4′-amino-2′-sulfophenyl)-pyrazol-5-one-3-carboxylic acid and 1 mole of 1-acetoacetylamino-4-aminobenzene-2,5-disulfonic acid | yellow |
| 117 | 2 moles of 2,5-dimethoxyaniline-4-β-sulfatoethylsulfone | Secondary condensation product of 1 mole of cyanuric chloride and 1 mole of 1-(4′-amino-2′-sulfophenyl)-pyrazol-5-one-3-carboxylic acid and 1 mole of 1-acetoacetylamino-4-aminobenzene-2,5-disulfonic acid | golden yellow |
| 118 | 2 moles of aniline-4-β-chloroethylsulfone | Secondary condensation product of 1 mole of cyanuric chloride, | orange-brown |

TABLE 2-continued

| Example | Diazo component | Coupling component | Color shade on cotton |
|---|---|---|---|
| | | 1 mole of 1-(4'-amino-2'-sulfo-phenyl)-pyrazol-5-one-3-carboxylic acid and 1 mole of 1-amino-8-naphthol-3,6-disulfonic acid | |
| 119 | 2 moles of 2-aminoanisole-4-β-sulfatoethylsulfone | Secondary condensation product of 1 mole of cyanuric chloride, 1 mole of 1-(4'-amino-2'-sulfo-phenyl)-pyrazol-5-one-3-carboxylic acid and 1 mole of 1-amino-8-naphthol-3,6-disulfonic acid | brown |
| 120 | 2 moles of 2-methoxy-5-methyl-aniline-4-β-sulfatoethylsulfone | Secondary condensation product of 1 mole of cyanuric chloride and 1 mole of methyl 1-(5'-amino-2'-sulfo-phenyl)-pyrazol-5-one-3-carboxylate and 1 mole of 1-amino-8-naphthol-4,6-disulfonic acid | brown |
| 121 | 2 moles of aniline-4-β-sulfato-ethylsulfone | Secondary condensation product of 1 mole of cyanuric chloride and 1 mole of methyl 1-(5'-amino-2'sulfo-phenyl)-pyrazol-5-one-3-carboxylate and 1 mole of 1-amino-8-naphthol-4,6-disulfonic acid | orange-brown |
| 122 | 2 moles of aniline-3-β-sulfato-ethylsulfone | Secondary condensation product of 1 mole of cyanuric chloride and 1 mole of 1-(4'-amino-2'-sulfophenyl)-pyrazol-5-one-3-carboxylic acid and 1 mole of 2-methylamino-5-naphthol-7-sulfonic acid | orange |
| 123 | 2 moles of 4-β-sulfatoethyl-sulfonylaniline-2-sulfonic acid | Secondary condensation product of 1 mole of cyanuric chloride and 1 mole of 1-(4'-amino-2'-sulfophenyl)-pyrazol-5-one-3-carboxylic acid and 1 mole of 2-methylamino-5-naphthol-7-sulfonic acid | orange |
| 124 | 2 moles of aniline-4-β-sulfato-ethylsulfone | Secondary condensation product of 1 mole of cyanuric chloride and 1 mole of 1-(3'-amino-2'-sulfophenyl)-pyrazol-5-one-3-carboxylic acid and 1 mole of 2-amino-8-naphthol-6-sulfonic acid | orange |
| 125 | 2 moles of 2-bromoaniline-4-β-sulfatoethylsulfone | Secondary condensation product of 1 mole of cyanuric chloride and 1 mole of 1-(3'-amino-2'-sulfophenyl)-pyrazol-5-one-3-carboxylic acid and 1 mole of 2-amino-8-naphthol-6-sulfonic acid | orange |
| 126 | 2 moles of 2-chloroaniline-5-β-sulfatoethylsulfone | Secondary condensation product of 1 mole of cyanuric chloride and 1 mole of 1-(4'-amino-2'-sulfo-phenyl)-pyrazol-5-one-3-carboxylic acid and 1 mole of 2-methylamino-8-naphthol-6-sulfonic acid | orange |
| 127 | 2 moles of 2,6-dichloroaniline-4-β-sulfatoethylsulfone | Secondary condensation prouduct of 1 mole of cyanuric chloride and 1 mole of 1-(4'-amino-2'-sulfo-phenyl)-pyrazol-5-one-3-carboxylic acid and 1 mole of 2-methylamino-8-naphthol-6-sulfonic acid | orange |
| 128 | 2 moles of aniline-4-β-sulfato-ethylsulfone | Tertiary condensation product of 1 mole of cyanuric chloride and 1 mole of 1-acetoacetyl-amino-4-aminobenzene-3-sulfonic acid, 1 mole of 2-amino-8-naphthol-3,6-disulfonic acid and 1 mole of β-aminopropionic acid | orange |
| 129 | 2 moles of aniline-3-β-sulfatoethylsulfone | Tertiary condensation product of 1 mole of cyanuric chloride and 1 mole of 1-acetoacetyl-amino-4-aminobenzene-3-sulfonic acid, 1 mole of 2-amino-8-naphthol-3,6-disulfonic acid | orange |

TABLE 2-continued

| Example | Diazo component | Coupling component | Color shade on cotton |
|---|---|---|---|
| | | and 1 mole of β-aminopropionic acid | |
| 130 | 2 moles of 2-aminoanisole-4-β-sulfatoethylsulfone | Tertiary condensation product of 1 mole of cyanuric chloride and 1 mole of 1-acetoacetyl-amino-4-aminobenzene-2,5-disulfonic acid, 1 mole of 2-amino-5-naphthol-1,7-disulfonic acid and 1 mole of N—methylaniline | orange |
| 131 | 2 moles of 8-β-sulfatoethylsulfonyl-2-amino-naphthalene-6-sulfonic acid | Tertiary condensation product of 1 mole of cyanuric chloride and 1 mole of 1-acetoacetyl-amino-4-aminobenzene-2,5-disulfonic acid, 1 mole of 2-amino-5-naphthol-1,7-disulfonic acid and 1 mole of N—methylaniline | orange |
| 132 | 2 moles of 2-amino-anisole-4-β-sulfatoethylsulfone | Reaction product of 1 mole of the primary condensation product obtained from equimolar amounts of cyanuric chloride and 1-(4'-amino-2'-sulfo-phenyl)-pyrazol-5-one-3-carboxylic acid and 1 mole of the primary condensation product obtained from equimolar amounts of cyanuric chloride and 2-amino-5-naphthol-7-sulfonic acid with 1 mole of 1,4-diaminobenzene-3-sulfonic acid | orange |
| 133 | 2 moles of aniline-3-β-sulfatoethylsulfone | Reaction product of 1 mole of the primary condensation product obtained from equimolar amounts of cyanuric chloride and 1-(4'-amino-2'-sulfo-phenyl)-pyrazol-5-one-3-carboxylic acid and 1 mole of the primary condensation product obtained from equimolar amounts of cyanuric chloride and 1-acetoacetylamino-4-aminobenzene-4-sulfonic acid with 1 mole of 1,3-diaminobenzene-4-sulfonic acid | yellow |
| 134 | 2 moles of 2-aminoanisole-4-β-sulfatoethylsulfone | Reaction product of 1 mole of the primary condensation product obtained from equimolar amounts of cyanuric chloride and 1-(4'-amino-2'-sulfo-phenyl)-pyrazol-5-one-3-carboxylic acid and 1 mole of the primary condensation product obtained from equimolar amounts of cyanuric chloride and 1-acetoacetylamino-4-aminobenzene-4-sulfonic acid with 1 mole of 1,3-diaminobenzene-4-sulfonic acid | yellow |
| 135 | 2 moles of aniline-4-β-sulfatoethylsulfone | Reaction product of 1 mole of the primary condensation product obtained from equimolar amounts of cyanuric chloride and 1-(3'-aminophenyl)-3-methyl-pyrazol-5-one and 1 mole of the primary condensation product obtained from equimolar amounts of cyanuric chloride and 2-amino-5-naphthol-1,7-disulfonic acid with 1 mole of 4,4'-diamino-biphenyl-3-sulfonic acid | orange |
| 136 | 2 moles of 6-β-sulfatoethylsulfonyl-2-amino-naphthalene-1-sulfonic acid | Reaction product of 1 mole of the primary condensation product obtained from equimolar amounts of cyanuric chloride and 1-(3'-aminophenyl)-3-methyl-pyrazol-5-one and 1 mole of the primary condensation product obtained from equimolar amounts of cyanuric chloride and 2-amino-5-naphthol-1,7-disulfonic acid with 1 mole of 4,4'-dia- | orange |

TABLE 2-continued

| Example | Diazo component | Coupling component | Color shade on cotton |
|---------|----------------|--------------------|-----------------------|
| 137 | 2 moles of 2-aminoanisole-5-β-sulfatoethylsulfone | mino-biphenyl-3-sulfonic acid Reaction product of 1 mole of the primary condensation product obtained from equimolar amounts of cyanuric chloride and 1-(5'-amino-2-sulfo-phenyl)-pyrazol-5-one-3-carboxylic acid and 1 mole of the primary condensation procuct obtained from equimolar amounts of cyanuric chloride and 2-amino-8-naphthol-6-sulfonic acid with 1 mole of 2,4-diaminotoluene-5-sulfonic acid | orange |

EXAMPLE 138

29.1 parts by weight of cyanuric chloride are dissolved in 90 parts by volume of acetone, with warming, and the solution is then allowed to run into 750 parts by volume of water at 12°-15° C., with stirring. Immediately thereafter a neutral solution of 40.8 parts by weight of 1-acetoacetyl-amino-4-amino-benzene-3-sulfonic acid in 250 parts by volume of water and 20 parts by weight of crystalline sodium acetate are added and the mixture is stirred for 10 minutes at 18°-20 C. A further neutral solution of 40.8 parts by weight of 1-acetoacetylamino-4-amino-benzene-3-sulfonic acid in 250 parts by volume of water and 45 parts by weight of sodium acetate are then added and the mixture is stirred for several hours at 25°-30° C. The solution of the coupling component which is thus obtained is allowed to run into the solution of the diazo component which is obtained in the following way:

74.7 parts by weight of 97.6% benzoxazolone-6-β-hydroxy-ethylsulfone are introduced at 80°-100° C. into 135 parts by weight of 98% strength sulfuric acid and the mixture is then kept at 140°-145° C. for 5 hours. After cooling, the mixture is discharged onto 525 parts by weight of ice and diazotized with 61.5 parts by volume of aqueous 5 N sodium nitrite solution. A slight excess of nitrous acid is destroyed with a little amidosulfonic acid and the pH is then adjusted to 6 by adding 140 parts by weight of calcium carbonate.

The solution of the coupling component is then added and the coupling reaction is carried out for 30 hours at 20°-22° C., the pH being kept at 5.7-6.0 by adding a total of 25 parts by weight of calcium carbonate. The reaction mixture is then warmed to 60°-65° C., the gypsum is filtered off and is washed with hot water and the combined filtrates are then divided into three equal portions.

30 parts by weight of sodium acetate (crystalline) and 25 parts by weight of copper sulfate are added to one portion of the dyestuff solution and the mixture is then kept at 50°-55° C. for 1 hour. The dyestuff is then precipitated by adding sodium chloride and is filtered off, dried and ground. This gives 87 parts by weight of a brown dyestuff powder which contains 75% of the dyestuff of the formula

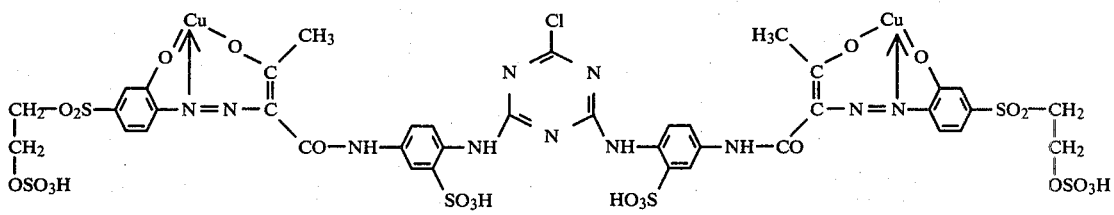

Yellow-brown prints and dyeings with very good general fastness properties can be obtained on cotton with the dyestuff.

EXAMPLE 139

15 parts by weight of crystalline sodium acetate and 14.7 parts by weight of crystalline cobalt sulfate are added to a further portion of the solution of the non-metallized dyestuff obtained according to Example 138 and the mixture is then kept at pH 5 for 1 hour at 50°-55° C. The dyestuff is precipitated by adding sodium chloride and is filtered off, dried and ground. Very fast prints, the shade of which is very similar to that produced by the copper complex dyestuff, can be produced on cotton with this cobalt complex dyestuff.

EXAMPLE 140

32 parts by weight of crystalline sodium acetate and 25 parts by weight of chromium-potassium sulfate are added to a further portion of the solution of the non-metallized dyestuff obtained according to Example 138 and the mixture is boiled under reflux for 3 hours at pH 5.0. The dyestuff is precipitated by adding sodium chloride and is filtered off, dried and ground. Very fast prints, which have a more reddish shade than those produced with the copper complex dyestuff, can be produced on cotton with this chromium complex dyestuff.

EXAMPLE 141

314.6 parts by weight of 2-aminophenol-4-β-sulfatoethylsulfone (94.5%) are suspended in 1,400 parts by volume of water and 600 parts by weight of ice and dissolved with 80 parts by weight of sodium carbonate to give a neutral solution. 205 parts by volume of 5 N sodium nitrite solution are then added, 10 parts by weight of kieselguhr are stirred in and the solution is clarified. The filtrate is allowed to run into a mixture of 260 parts by volume of 31% strength hydrochloric acid and 1,500 parts by weight of ice, the resulting mixture is stirred for 1 hour at 2°–5° C., a little excess nitrous acid is destroyed with amidosulfonic acid and the pH is then adjusted to 5.0–6.0 with sodium bicarbonate.

The coupling reaction is carried out with a coupling solution as described in Example 110 for 15 hours at pH 6.8 to 7.0.

The pH is then adjusted to 5.0–5.5 with a little acetic acid, 300 parts by weight of crystalline sodium acetate and 250 parts by weight of crystalline copper sulfate are added and the mixture is warmed at 50°–55° C. for one hour. After clarifying, the dyestuff solution is spray-dried. This gives 3,300 parts by weight of a dyestuff powder which contains 41% of the dyestuff of the formula

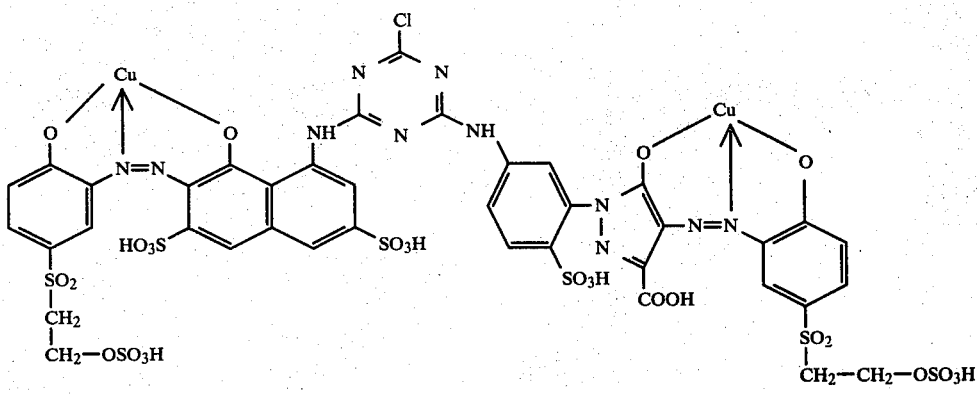

Intense fast brown dyeings and prints can be produced on cotton with this dyestuff.

The dyestuffs listed in Table 3 can be prepared in a manner similar to that described in the given examples.

TABLE 3

| Example | Diazo component | Coupling component | Complex-forming metal | Color shade on cotton |
|---|---|---|---|---|
| 142 | 2 moles of 2-aminophenol-4-β-sulfatoethylsulfone | Secondary condensation product of 1 mole of cyanuric chloride and 2 moles of 1-(4'-amino-2'-sulfo-phenyl)-pyrazol-5-one-3-carboxylic acid | copper | yellow-brown |
| 143 | 2 moles of 2-aminophenol-4-β-sulfatoethylsulfone | Secondary condensation product of 1 mole of cyanuric chloride and 2 moles of 1-(4'-amino-2'-sulfo-phenyl)-pyrazol-5-one-3-carboxylic acid | chromium | orange-brown |
| 144 | 2 moles of 2-aminophenol-4-β-sulfatoethylsulfone | Secondary condensation product of 1 mole of cyanuric chloride and 2 moles of 1-(4'-amino-2'-sulfo-phenyl)-pyrazol-5-one-3-carboxylic acid | cobalt | yellow-brown |
| 145 | 2 moles of 2-aminophenol-5-β-sulfatoethylsulfone | Secondary condensation product of 1 mole of cyanuric chloride and 2 moles of 1-(4'-amino-2'-sulfo-phenyl)-pyrazol-5-one-3-carboxylic acid | copper | yellow-brown |
| 146 | 2 moles of 2-aminophenol-5-β-sulfatoethylsulfone | Secondary condensation product of 1 mole of cyanuric chloride and 2 moles of 1-(4'-amino-2'-sulfo-phenyl)-pyrazol-5-one-3-carboxylic acid | chromium | opaque red |
| 147 | 2 moles of 2-aminophenol-4-β-sulfatoethylsulfone | Secondary condensation product of 1 mole of cyanuric chloride and 2 moles of 1-(5'-amino-2'-sulfo-phenyl)-pyrazol-5-one-3-carboxylic acid | copper | yellow-brown |
| 148 | 2 moles of 2-aminophenol-4-β-sulfatoethylsulfone | Secondary condensation product of 1 mole of cyanuric chloride and 1 mole of 1-(4'-amino-2'-sulfophenyl)-pyrazol-5-one-3-carboxylic acid and 1 mole of 1-acetoacetylamino-4-aminobenzene-3-sulfonic acid | copper | yellow-brown |
| 149 | 2 moles of 2-aminophenol- | Secondary condensation pro- | copper | yellow- |

TABLE 3-continued

| Example | Diazo component | Coupling component | Complex-forming metal | Color shade on cotton |
|---|---|---|---|---|
| | 5-β-sulfatoethylsulfone | duct of 1 mole of cyanuric chloride and 1 mole of 1-(4'-amino-2'-sulfophenyl)-pyrazol-5-one-3-carboxylic acid and 1 mole of 1-acetoacetylamino-4-aminobenzene-3-sulfonic acid | | brown |
| 150 | 2 moles of 6-nitro-2-aminophenol-4-β-sulfatoethylsulfone | Secondary condensation product of 1 mole of cyanuric chloride and 1 mole of 1-(4'-amino-2'-sulfophenyl)-pyrazol-5-one-3-carboxylic acid and 1 mole of 1-acetoacetylamino-4-aminobenzene-3-sulfonic acid | copper | brown |
| 151 | 2 moles of 6-bromo-2-aminophenol-4-β-sulfatoethylsulfone | Secondary condensation product of 1 mole of cyanuric chloride and 1 mole of 1-(4'-amino-2'-sulfophenyl)-pyrazol-5-one-3-carboxylic acid and 1 mole of 1-acetoacetylamino-4-aminobenzene-3-sulfonic acid | copper | yellow-brown |
| 152 | 2 moles of 2-aminophenol-4-β-sulfatoethylsulfone | Secondary condensation product of 1 mole of cyanuric chloride and 1 mole of 1-(4'-amino-2'-sulfophenyl)-pyrazol-5-one-3-carboxylic acid and 1 mole of 1-amino-8-naphthol-3,6-disulfonic acid | copper | brown |
| 153 | 2 moles of 2-aminophenol-5-β-sulfatoethylsulfone | Secondary condensation product of 1 mole of cyanuric chloride and 1 mole of 1-(4'-amino-2'-sulfophenyl)-pyrazol-5-one-3-carboxylic acid and 1 mole of 1-amino-8-naphthol-3,6-disulfonic acid | copper | brown |
| 154 | 2 moles of 2-aminophenol-4-β-sulfatoethylsulfone | Secondary condensation product of 1 mole of cyanuric chloride and 1 mole of 1-(4'-amino-2'-sulfophenyl)-pyrazol-5-one-3-carboxylic acid and 1-amino-8-naphthol-4,6-disulfonic acid | copper | brown |
| 155 | 2 moles of 2-aminophenol-4-β-sulfatoethylsulfone | Secondary condensation product of 1 mole of cyanuric chloride and 1 mole of 1-(4'-amino-2'-sulfophenyl)-pyrazol-5-one-3-carboxylic acid and 1-amino-8-naphthol-4,6-disulfonic acid | chromium | brown |
| 156 | 2 moles of 2-aminophenol-4-β-sulfatoethylsulfone | Secondary condensation product of 1 mole of cyanuric chloride and 1 mole of 1-(4'-amino-2'-sulfophenyl)-pyrazol-5-one-3-carboxylic acid and 1-amino-8-naphthol-4,6-disulfonic acid | cobalt | brown |
| 157 | 2 moles of 2-aminophenol-5-β-sulfatoethylsulfone | Secondary condensation product of 1 mole of cyanuric chloride and 1 mole of 1-(4'-amino-2'-sulfophenyl)-pyrazol-5-one-3-carboxylic acid and 1-amino-8-naphthol-4,6-disulfonic acid | copper | brown |
| 158 | 2 moles of 2-aminophenol-5-β-sulfatoethylsulfone | Secondary condensation product of 1 mole of cyanuric chloride and 1 mole of 1-(4'-amino-2'-sulfophenyl)-pyrazol-5-one-3-carboxylic acid and 1-amino-8-naphthol-4,6-disulfonic acid | cobalt | brown |
| 159 | 2 moles of 2-aminophenol-5-β-sulfatoethylsulfone | Secondary condensation product of 1 mole of cyanuric chloride and 1 mole of 1-(4'-amino-2'-sulfophenyl)-pyrazol-5-one-3-carboxylic acid and 1-amino-8-naph- | chromium | brown |

TABLE 3-continued

| Example | Diazo component | Coupling component | Complex-forming metal | Color shade on cotton |
|---|---|---|---|---|
| | | thol-4,6-disulfonic acid | | |
| 160 | 2 moles of 2-aminophenol-4-β-sulfatoethylsulfone | Secondary condensation product of 1 mole of cyanuric chloride and 1 mole of methyl 1-(4'-amino-2'-sulfophenyl)-pyrazol-5-one-3-carboxylate and 1 mole of 2-amino-5-naphthol-7-sulfonic acid | copper | brown |
| 161 | 2 moles of 2-aminophenol-5-β-sulfatoethylsulfone | Secondary condensation product of 1 mole of cyanuric chloride and 1 mole of methyl 1-(4'-amino-2'-sulfophenyl)-pyrazol-5-one-3-carboxylate and 1 mole of 2-amino-5-naphthol-7-sulfonic acid | copper | brown |
| 162 | 2 moles of 2-aminophenol-5-β-sulfatoethylsulfone | Secondary condensation product of 1 mole of cyanuric chloride and 1 mole of 1-(5'-amino-2'-sulfophenyl)-pyrazol-5-one-3-carboxylic acid and 1 mole of 2-amino-8-naphthol-6-sulfonic acid | copper | brown |
| 163 | 2 moles of 2-aminophenol-4-β-sulfatoethylsulfone | Secondary condensation product of 1 mole of cyanuric chloride and 1 mole of 1-(5'-amino-2'-sulfophenyl)-pyrazol-5-one-3-carboxylic acid and 1 mole of 2-amino-8-naphthol-6-sulfonic acid | copper | brown |
| 164 | 2 moles of 2-aminophenol-4-β-sulfatoethylsulfone | Secondary condensation product of 1 mole of cyanuric chloride and 1 mole of 1-(3'-aminophenyl)-3-methyl-pyrazol-5-one and 1 mole of 7-amino-1-naphthol-3,6-disulfonic acid | copper | brown |
| 165 | 2 moles of 2-aminophenol-5-β-sulfatoethylsulfone | Secondary condensation product of 1 mole of cyanuric chloride and 1 mole of 1-(3'-aminophenyl)-3-methyl-pyrazol-5-one and 1 mole of 7-amino-1-naphthol-3,6-disulfonic acid | copper | brown |
| 166 | 2 moles of 2-aminophenol-5-β-sulfatoethylsulfone | Tertiary condensation product of 1 mole of cyanuric chloride and 1 mole of 1-(4'-amino-2'-sulfophenyl)-pyrazol-5-one-carboxylic acid, 1 mole of 2-methylamino-8-naphthol-6-sulfonic acid and 1 mole of aniline-3-sulfonic acid | copper | brown |
| 167 | 2 moles of 2-aminophenol-4-β-sulfatoethylsulfone | Tertiary condensation product of 1 mole of cyanuric chloride and 1 mole of 1-(4'-amino-2'-sulfophenyl)-pyrazol-5-one-3-carboxylic acid, 1 mole of 2-methylamino-8-naphthol-6-sulfonic acid and 1 mole of aniline-3-sulfonic acid | copper | brown |
| 168 | 2 moles of 2-aminophenol-4-β-sulfatoethylsulfone | Secondary condensation product of 1 mole of cyanuric chloride and 1 mole of 1-acetoacetylamino-4-aminobenzene-3-sulfonic acid and 1 mole of 2-amino-5-naphthol-7-sulfonic acid | copper | brown |
| 169 | 2 moles of 2-aminophenol-5-β-sulfatoethylsulfone | Secondary condensation product of 1 mole of cyanuric chloride and 1 mole of 1-acetoacetylamino-4-aminobenzene-3-sulfonic acid and 1 mole of 2-amino-5-naphthol-7-sulfonic acid | copper | brown |
| 170 | 2 moles of 2-aminophenol-4-β-sulfatoethylsulfone | Reaction product of 2 moles of the secondary condensation product obtained from equi- | copper | yellow-brown |

TABLE 3-continued

| Example | Diazo component | Coupling component | Complex-forming metal | Color shade on cotton |
|---|---|---|---|---|
| | | molar amounts of cyanuric chloride, 1-(4'-amino-2'-sulfophenyl)-pyrazol-5-one-3-carboxylic acid and ammonia with 1 mole of 4,4'-diaminostilbene-2,2'-disulfonic acid | | |
| 171 | 2 moles of 2-aminophenol-5-β-sulfatoethylsulfone | Reaction product of 2 moles of the secondary condensation product obtained from equimolar amounts of cyanuric chloride, 1-(4'-amino-2'-sulfophenyl)-pyrazol-5-one-3-carboxylic acid and ammonia with 1 mole of 4,4'-diaminostilbene-2,2'-disulfonic acid | copper | yellow-brown |
| 172 | 2 moles of 2-aminophenol-5-β-sulfatoethylsulfone | Reaction product of 2 moles of the primary condensation product obtained from equimolar amounts of cyanuric chloride and 1-(5'-amino-2'-sulfophenyl)-pyrazol-5-one-3-carboxylic acid with 1 mole of 4,4'-diamino-5,5'-dimethyl-biphenyl-2,2'-disulfonic acid | copper | yellow-brown |
| 173 | 2 moles of 2-aminophenol-4-β-sulfatoethylsulfone | Reaction product of 2 moles of the primary condensation product obtained from equimolar amounts of cyanuric chloride and 1-(5'-amino-2'-sulfophenyl)-pyrazol-5-one-3-carboxylic acid with 1 mole of 4,4'-diamino-5,5'-dimethyl-biphenyl-2,2'-disulfonic acid | cobalt | yellow-brown |
| 174 | 2 moles of 2-aminophenol-4-β-sulfatoethylsulfone | Reaction product of 2 moles of the secondary condensation product obtained from equimolar amounts of cyanuric chloride, 1-acetoacetylamino-4-aminobenzene-3-sulfonic acid and aniline-4-sulfonic acid with 1 mole of 4,4'-diaminoazobenzene | copper | yellow-brown |
| 175 | 2 moles of 2-aminophenol-4-β-sulfatoethylsulfone | Reaction product of 2 moles of the secondary condensation product obtained from equimolar amounts of cyanuric chloride, 1-acetoacetylamino-4-aminobenzene-3-sulfonic acid and aniline-4-sulfonic acid with 1 mole of 4,4'-diaminoazobenzene | chromium | yellow-brown |
| 176 | 2 moles of 2-aminophenol-4-β-sulfatoethylsulfone | Reaction product of 1 mole of the primary condensation product obtained from equimolar amounts of cyanuric chloride and 1-(4'-amino-2'-sulfophenyl)-pyrazol-5-one-3-carboxylic acid and 1 mole of the primary condensation product obtained from equimolar amounts of cyanuric chloride and 1-amino-8-naphthol-3,6-disulfonic acid with 1 mole of 1,4-diamino-3-methoxy-benzene-5-sulfonic acid | copper | brown |
| 177 | 2 moles of 2-aminophenol-4-β-sulfatoethylsulfone | Reaction product of 2 moles of the primary condensation product obtained from equimolar amounts of cyanuric chloride and ethyl 1-(4'-amino-2'-sulfophenyl)-pyrazol-5-one-3-carboxylate with 1 mole of 1,2-diaminoethane | copper | yellow-brown |
| 178 | 2 moles of 2-aminophenol-4-β-sulfatoethylsulfone | Reaction product of 1 mole of the primary condensation pro- | copper | yellow-brown |

TABLE 3-continued

| Example | Diazo component | Coupling component | Complex-forming metal | Color shade on cotton |
|---|---|---|---|---|
|  |  | duct obtained from equimolar amounts of cyanuric chloride and 1-acetoacetylamino-4-amino-2,5-disulfonic acid and 1 mole of the primary condensation product obtained from equimolar amounts of cyanuric chloride and 1-(4′-aminophenyl)-3-methyl-pyrazol-5-one with 1 mole of 4,4′-diaminobiphenyl-3-sulfonic acid |  |  |
| 179 | 2 moles of 2-aminophenol-5-β-sulfatoethylsulfone | Reaction product of 2 moles of the secondary condensation product obtained from equimolar amounts of cyanuric chloride, 1-acetoacetylamino-4-aminobenzene-2,5-disulfonic acid and β-aminoethanol with 1 mole of 4,4′-diamino-3,3′-dimethyldiphenylamine | copper | yellow-brown |
| 180 | 2 moles of 2-aminophenol-5-β-sulfatoethylsulfone | Reaction product of 1 mole of the secondary condensation product obtained from equimolar amounts of cyanuric chloride, 1-acetoacetylamino-4-aminobenzene-3-sulfonic acid and methyl taurine with 1 mole of 2,6-diaminonaphthalene | copper | yellow-brown |
| 181 | 2 moles of 2-aminophenol-5-β-sulfatoethylsulfone | Reaction product of 1 mole of the primary condensation product obtained from equimolar amounts of cyanuric chloride and 1-(5′-amino-2′-sulfophenyl)-pyrazol-5-one-3-carboxylic acid and 1 mole of the primary condensation product obtained from equimolar amounts of cyanuric chloride and 2-amino-5-naphthol-7-sulfonic acid with 1 mole of 2,5-diaminobenzoic acid | copper | brown |
| 182 | 2 moles of 2-aminophenol-5-β-sulfatoethylsulfone | Reaction product of 1 mole of the primary condensation product obtained from equimolar amounts of cyanuric chloride and 1-acetoacetyl-amino-4-aminobenzene-3-sulfonic acid and 1 mole of the primary condensation product obtained from equimolar amounts of cyanuric chloride and 2-amino-8-naphthol-6-sulfonic acid with 1 mole of 1,4-diaminobenzene-2-sulfonic acid | copper | brown |

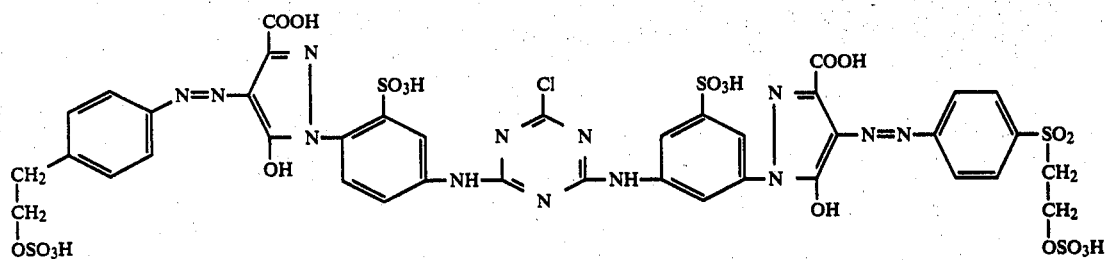
or a salt thereof.
11. The compound according to claim 1 of the formula
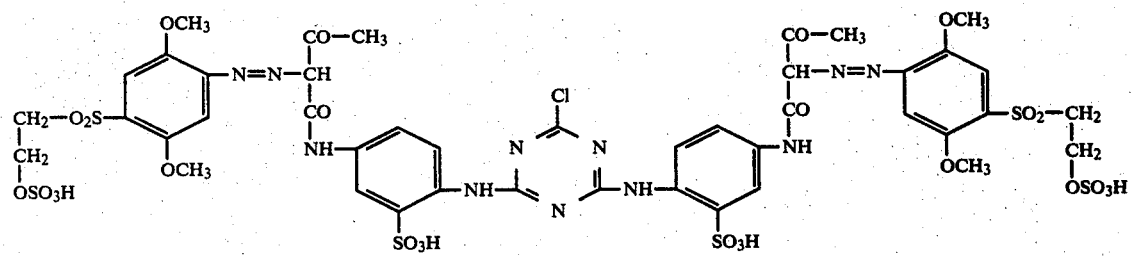
or a salt thereof.
12. The compound according to claim 1 of the formula
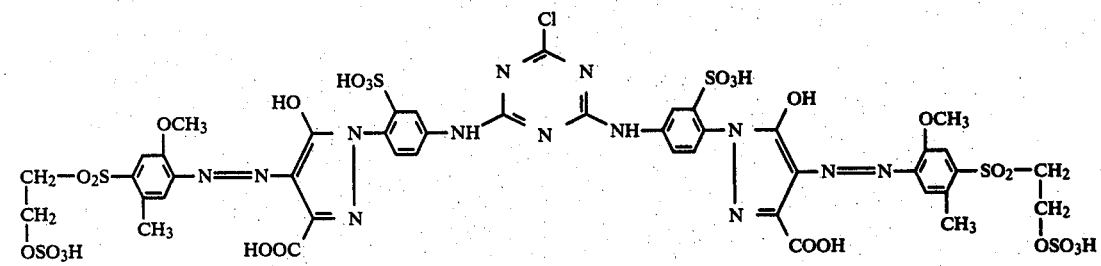
mula
or a salt thereof.
13. A copper, chromium or cobalt complex dyestuff according to claim 1.
14. A dyestuff of the formula
15. A deystuff of the formula
16. A dyestuff of the formula
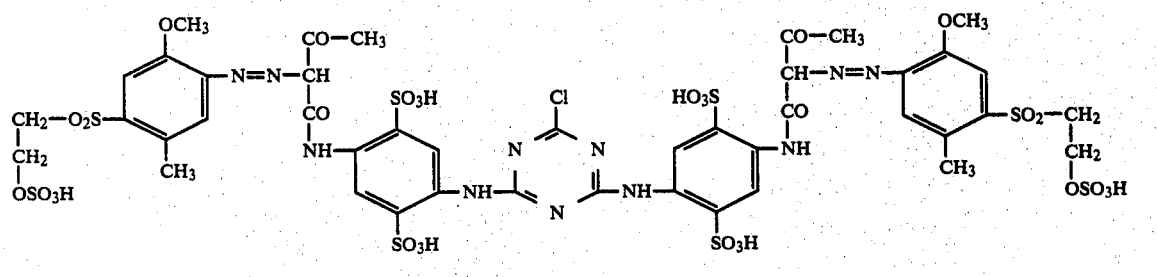

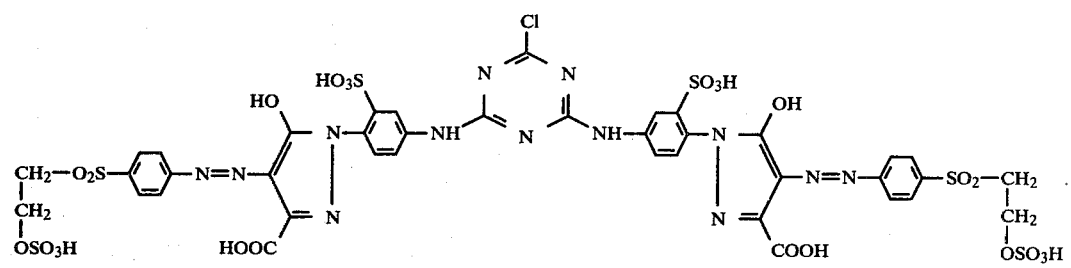

What is claimed is:

1. A water-soluble dyestuff which in the form of the free acid has the formula (1)

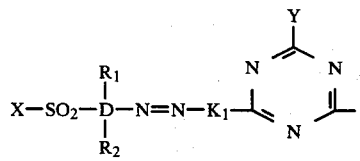

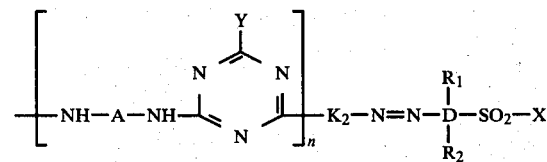

in which $K_1$ and $K_2$ are identical to or different from each other and $K_1$ is, in the form of the free acid, a radical of the formula

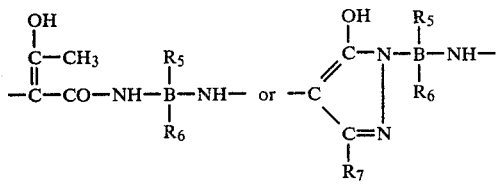

in which $R_5$, $R_6$ and $R_7$ are identical to or different from each other and $R_5$ is hydrogen, lower alkyl, lower alkoxy or sulfo, $R_6$ is hydrogen, lower alkyl or sulfo, $R_7$ is lower alkyl, carboxy or carbalkoxy with 1 to 4 C atoms in the alkyl moiety and B is a benzene nucleus or a naphthalene nucleus, and $K_2$ is, in the form of the free acid, a radical of the formula

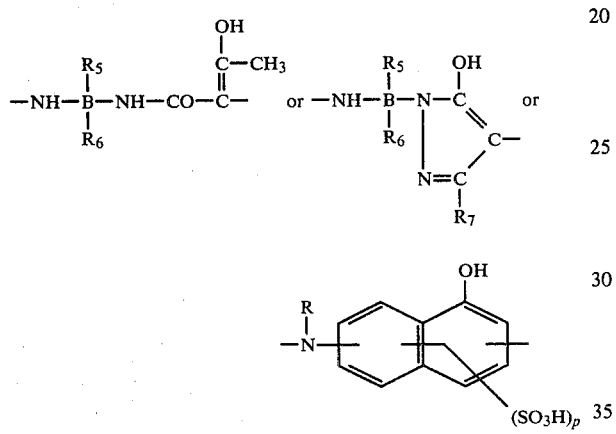

in which B, $R_5$, $R_6$ and $R_7$ are as defined above and R is hydrogen or lower alkyl and p is 1 or 2, the radicals $K_1$ and $K_2$ being identical to or different from each other and each bonded via the amino groups to the s-triazine radicals and bonded to the azo groups in ortho-position to the hydroxy group, n is zero or 1, D is a benzene nucleus or naphthalene nucleus, $R_1$ is in ortho-position to the azo group and is hydrogen, halogen, lower alkyl, lower alkoxy, hydroxy, carboxy or sulfo, $R_2$ is hydrogen, halogen, lower alkyl, lower alkoxy, nitro or sulfo, $R_1$ and $R_2$ being identical to or different from one another, X is $\beta$-thiosulfatoethyl, $\beta$-chloroethyl, $\beta$-sulfatoethyl or vinyl, A is an aliphatic radical of 2–10 C atoms or an aliphatic radical of, in total, 2–6 C atoms which may be interrupted by a heteroatom and/or a cycloaliphatic radical, or is a cycloaliphatic radical or is a benzene nucleus or a naphthalene nucleus, the nuclei may be substituted by substituents selected from the group consisting of lower alkyl, lower alkoxy, chlorine, sulfo, carboxy and lower alkanoylamino, or A is

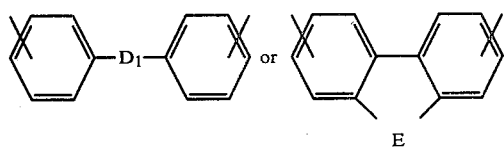

wherein the nuclei may be substituted by substituents selected from the group consisting of lower alkyl, lower alkoxy, sulfo, carboxy and chlorine, $D_1$ is a direct covalent bond or a bridge member and E is —O—, —S—, —NH— or —$SO_2$—, and Y is chlorine, fluorine, bromine, sulfo or a group of the formula —S—R' or —O—R", in which R' is lower alkyl, substituted lower alkyl, phenyl, naphthyl, substituted phenyl, substituted naphthyl or 2-benzthiazolyl and R" is hydrogen or has the meaning of R' with the exception of 2-benzthiazolyl, or Y is an amino group of the formula —$NR_3R_4$, in which $R_3$ is hydrogen, an optionally substituted lower aliphatic radical, an optionally substituted araliphatic radical or a cycloaliphatic radical and $R_4$ is hydrogen, an optionally substituted lower aliphatic radical or an optionally substituted aromatic radical or an optionally substituted araliphatic radical or is a hydroxy group, a lower alkoxy, or an optionally substituted amino group, or $R_3$ and $R_4$ together with the nitrogen atom form a ring containing a lower alkylene and optionally a hetero-atom; or a copper, chromium or cobalt complex dyestuff of the above compounds of the formula (1) wherein one or both of the $R_1$s are hydroxy.

2. A dyestuff according to claim 1 in which D, $R_1$, $R_2$, $K_1$, $K_2$, A, n and X are as defined in claim 1 and Y is chlorine, bromine, fluorine, sulfo, amino, methylamino, ethylamino, dimethylamino, $\beta$-hydroxyethyl-amino, N,N-di($\beta$-hydroxyethyl)-amino, $\beta$-methoxyethyl-amino, $\beta$-sulfatoethyl-amino, $\beta$-sulfoethyl-amino, N-methyl-N-$\beta$-sulfoethyl-amino, N-$\beta$-carboxyethyl-amino, N-(carboxyphenyl)-amino, N-(sulfophenyl)-amino, N-(disulfo-phenyl)-amino, N-(sulfonaphthyl(1))-amino, N-methyl-anilino, morpholino, iso-propoxy, phenoxy or $\beta$-hydroxyethyl-thioether.

3. A dyestuff according to claim 1, with D, $R_1$, $R_2$, $K_1$, $K_2$, A, n and X as defined in claim 1, in which Y is chlorine.

4. A dyestuff according to claim 1, with Y, $R_1$, $R_2$, $K_1$, $K_2$, A, n and X as defined in claim 1, and D is a benzene nucleus.

5. A dyestuff according to claim 1, 2 or 3 with Y, $K_1$, $K_2$, A, n and X as defined in claim 1, 2 or 3 and D is the naphthalene nucleus bonded in 2-position to the azo group, $R_1$ is hydrogen and $R_2$ sulfo in the 6-position of the naphthalene nucleus, or $R_1$ is sulfo and $R_2$ is hydrogen.

6. A dyestuff according to claim 4, in which the group —$SO_2$—X is in meta-position or para-position to the azo group.

7. A dyestuff according to claim 1 defined in claim 1, in which D is a naphthalene nucleus bonded in 2-position to the azo group, and the group —$SO_2$—X is bonded in the 6-position or 8-position.

8. A dyestuff according to claim 1, wherein X is vinyl or $\beta$-sulfatoethyl.

9. A dyestuff according to claim 1, with Y, $R_1$, $R_2$, $K_1$, $K_2$, A, n, D and X as defined in claim 1, wherein, in the coupling components $K_1$ and $K_2$, the radicals B each are a benzene nucleus, each $R_5$, identical or different to each other, is hydrogen or sulfo and $R_6$ is sulfo.

10. The compound according to claim 1 of the formula